United States Patent
Baba et al.

(10) Patent No.: US 7,865,763 B2
(45) Date of Patent: Jan. 4, 2011

(54) DATA REPLICATION METHOD

(75) Inventors: Tsunehiko Baba, Hachioji (JP);
Tomohiro Hanai, Yokohama (JP); Shinji Hamada, Yokohama (JP); Kenji Kushi, Yokohama (JP); Norihiro Hara, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 328 days.

(21) Appl. No.: 12/222,281

(22) Filed: Aug. 6, 2008

(65) Prior Publication Data
US 2009/0240974 A1    Sep. 24, 2009

(30) Foreign Application Priority Data
Mar. 18, 2008  (JP) .............................. 2008-069755

(51) Int. Cl.
*G06F 11/00*    (2006.01)
(52) U.S. Cl. .................. 714/3; 714/6; 714/10; 714/11; 709/208
(58) Field of Classification Search ...................... 714/3, 714/6, 10, 11; 709/208
See application file for complete search history.

(56) References Cited

U.S. PATENT DOCUMENTS 7,461,130 B1 *  12/2008  AbdelAziz et al. ........... 709/208
2003/0018732 A1   1/2003  Jacobs et al.
2005/0187891 A1 *  8/2005  Johnson et al. ................. 707/1
2008/0126853 A1 *  5/2008  Callaway et al. .............. 714/13

\* cited by examiner

*Primary Examiner*—Robert Beausoliel
*Assistant Examiner*—Charles Ehne
(74) *Attorney, Agent, or Firm*—Stites & Harbison, PLLC; Juan Carlos A. Marquez, Esq

(57) ABSTRACT

Provided is a data replication method capable of reducing the number of communication times when a processing result of an active system is replicated to a standby system. The data replication method, in which a first computer receives a first message containing a first processing request, and a plurality of second computers replicates the first message, includes the steps of: sending, by a third computer, the first message to the first computer and the second computers; sending, by each of the second computers, a message receive notification of the first message to the first computer; sending, by the first computer, after reception of the message receive notification from the second computers, the message receive notification of the first message to the third computer; and sending, by the first computer, a notification indicating that the first processing request becomes executable by the first computer to the second computers.

20 Claims, 18 Drawing Sheets

FIG. 15A

| MESSAGE ID | MESSAGE PROCESSING RESULT CONTENT | | | RESULT MESSAGE ID | RESULT MESSAGE CONTENT |
|---|---|---|---|---|---|
| | DATA | BEFORE CHANGE | AFTER CHANGE | | |
| Sync-12 | A | A1 | A2 | Out-12 | COMPLETION OF WITHDRAWAL OF SUM OF MONEY P FROM ACCOUNT M (BALANCE Q) |

1301 / 1304 / 1302 / 1303 — T131

| RESULT MESSAGE CONTENT | ALREADY FIXED MESSAGE ID |
|---|---|
| COMPLETION OF WITHDRAWAL OF SUM OF MONEY P FROM ACCOUNT M (BALANCE Q) | In-13 | Sync-11 |

| RESULT MESSAGE ID | RESULT MESSAGE CONTENT |
|---|---|
| Out-12 | COMPLETION OF WITHDRAWAL OF SUM OF MONEY P FROM ACCOUNT M (BALANCE Q) |

| MESSAGE ID | MESSAGE PROCESSING RESULT CONTENT | | | RESULT MESSAGE ID | RESULT MESSAGE CONTENT | ALREADY FIXED MESSAGE ID | SYNCHRONIZATION STATE AT STANDBY SYSTEM | |
|---|---|---|---|---|---|---|---|---|
| | DATA | BEFORE CHANGE | AFTER CHANGE | | | | STANDBY SYSTEM 1 | STANDBY SYSTEM N |
| Sync-12 | A | A1 | A2 | Out-12 | COMPLETION OF WITHDRAWAL OF SUM OF MONEY P FROM ACCOUNT M (BALANCE Q) | In-13 Sync-11 | UN SYNCHRO NIZED | SYNCHRO NIZED |

| MESSAGE ID | RESULT MESSAGE CONTENT |
|---|---|
| Out-12 | COMPLETION OF WITHDRAWAL OF SUM OF MONEY P FROM ACCOUNT M (BALANCE Q) |

112

| MESSAGE TYPE (314) | NECESSITY OF COMPLEMENTING (315) | SOURCE INFORMATION (316) | TIME RANGE (317) | UPPER LIMIT NUMBER OF COMPLEMENTS (318) |
|---|---|---|---|---|
| In | NO | ALL CLIENTS | — | — |
| Sync | YES | CLIENT 2 | UNLIMITED | UNLIMITED |
| Sync | NO | OTHER THAN CLIENT 2 | — | — |
| Out | YES | CLIENT 1 | 10 SECONDS | 10 MESSAGES |
| Out | YES | OTHER THAN CLIENT 1 | NONE | UNLIMITED |

FIG. 22 ns
DATA REPLICATION METHOD

CLAIM OF PRIORITY

The present application claims priority from Japanese application P2008-69755 filed on Mar. 18, 2008, the content of which is hereby incorporated by reference into this application.

BACKGROUND OF THE INVENTION

This invention relates to a computer system which has fault tolerance, and more particularly, to a technology of guaranteeing consistency of processed contents by replicating data between computers.

An application system required of fault tolerance (or redundancy) can secure reliability through a cluster configuration which includes an active system for processing data by a plurality of systems and a standby system for taking over data processing when a fault occurs in the active system. As in the case of a database (DB), an application that accumulates data in a disk takes over data by a shared disk accessible from the active and standby systems to continue processing by the standby system. Thus, I/O processing for writing data on the disk in synchronization has to be carried out, and system performance is decided by I/O processing performance.

In the widely used application system, there has recently been an increase in cases where system performance equal to or more than the system performance decided by the I/O processing performance is required. To meet such a request, an in-memory application system has been developed, which improves system performance by holding data only in a memory and eliminating synchronous I/O processing in a disk device.

This in-memory application system inhibits sharing of the data held in the memory with the standby system as it is. Thus, for example, as in the case of an in-memory DB, in an application that needs fault tolerance inhibiting a loss of data held in the memory by a fault, the data has to be made redundant through communication carried out from the active system to the standby system to hold a copy of data of the active system in a memory of the standby system.

Considering fault tolerance, in the in-memory application system, in the 2-unit configuration of the active and standby systems, when a fault occurs in one of the systems, data remains in only one system. When a system fault occurs in the remaining computer, a data loss occurs. Consequently, the data of the memory which is a volatile storage medium has to be saved in a nonvolatile storage medium such as a disk. However, when a fault occurs in the middle of the data saving after the number of remaining system is one, data that has not been saved is lost. Thus, when high fault tolerance is required, data replication has to be simultaneously carried out for two or more standby systems. In this case, communication is executed with the plurality of standby systems through use of multicast communication.

As a communication method for carrying out data replication for the plurality of standby systems, a 2-phase commit method is known. The 2-phase commit method includes a preparation phase for executing communication to send data to be replicated when data is replicated from the active system to the standby system, and a commit phase for executing communication to fix, when the active system checks reception of data at the standby systems, the sent data. Upon success of the commit phase, consistency is guaranteed in a state where the data is fixed between the active system as a source and the standby system, thereby completing an application process carried out by the active system.

In the case of the 2-phase commit method, multicast communication has to be executed twice to synchronize the data of the active system with the standby systems and to complete the application process at the active system. Thus, as the number of standby systems is larger, time until reception of phase responses from the standby systems becomes longer, causing a problem of greater overhead.

To solve the problem, US 2003/0018732 discloses a technology of realizing data redundancy by using, to reduce the number of communication times, a synchronization method A based on a 1-phase commit method for periodically notifying the standby system of data updating of the active system through multicast communication (heartbeat communication), and executing data replication through a request of data made by the standby system to the active system for data updating at the time of reception. US 2003/0018732 additionally describes a preparation phase of data updated through heartbeat communication, and a synchronization method B for substituting the multicast communication of the 2-phase commit method with a heartbeat by sending commitments of preparation phase-finished data en bloc, thereby disclosing a technology of realizing data redundancy by reducing the number of communication times more than the number of data updating times. US 2003/0018732 associatively discloses a technology of, even when standby systems whose synchronization with the active system has failed in the synchronization methods A and B are present, enabling the active system to fix a process, and the synchronization-failed standby systems to request resending of unsynchronized data to the active system to be resynchronized.

SUMMARY OF THE INVENTION

The technologies described in US 2003/0018732 have the following problems when applied to the in-memory application system. First, to send data again according to a request from the synchronization-failed standby system, data update contents of the active system have to be stored, and data of optional time has to be generated again. The storage of update contents consumes a memory, placing a limit on a data amount to be held in the system. When a fault occurs in the active system, the data held in the memory is lost. Consequently, update contents similarly have to be stored in the standby system, causing memory consumption.

The data replication through the heartbeat causes a delay of replication of the data update contents of the active system in the standby system. In other words, a time delay is generated until fixing of an application process at the active system. Consequently, overhead occurs in the in-memory application system used for realizing fast processing. Thus, the reduction effect of the number of communication times by the data replication technology disclosed in US 2003/0018732 is ill-suited to the in-memory application system.

This invention has been devised to solve the aforementioned problems, and it is an object of this invention to provide a highly reliable data replication method capable of reducing the number of necessary communication times when a processing result of an active system is replicated to a standby system through communication in an in-memory application system which has a cluster configuration.

According to this invention, there is provided a data replication method used in a data replication system including: a first computer equipped with a processor and a memory to execute an application; and a second computer equipped with a processor and a memory and capable of taking over from an active system, the first computer receiving a first message containing a first processing request, a plurality of the second computers replicating the first message. The method includes the steps of: sending, by a third computer, the first message to the first computer and the plurality of the second computers; sending, by each of the second computers, a message receive notification of the first message to the first computer; waiting, by the first computer, for the message receive notifications from the second computers; and receiving, by the first computer, the message receive notifications from the plurality of second computers. The step of receiving the message receive notifications from the plurality of the second computers includes the steps of: sending, by the first computer, after reception of the message receive notifications from the plurality of the second computers, the message receive notification of the first message to the third computer; validating, by the first computer, after the reception of the message receive notifications from the plurality of the second computers, the first processing request to be executable by the first computer; and notifying, by the first computer, after the reception of the message receive notifications from the plurality of the second computers, the second computers of validity of the first message.

Moreover, one of the first computer and the second computer executes a process of the application only in the memory.

According to this invention, the third computer sends a message to the second computers as the standby systems through the multicast communication, and each of the second computers (standby systems) notifies the first computer (active system) of message reception, thereby completing the message reception process of the first computer, and the message replication between the first and second computers. As a result, highly reliable data replication can be realized while the amount of communication is reduced.

BRIEF DESCRIPTION OF THE DRAWINGS

FIG. 15A illustrates an example of the message T131 to be sent in the step S127 according to a third embodiment of this invention.

FIG. 15B illustrates an example of the execution result message C4 (message T132) generated in the step S126 according to a third embodiment of this invention.

FIG. 16A illustrates an example of the synchronization message sending buffer 113 at the time of sending the message in the step S127 according to a third embodiment of this invention.

FIG. 16B illustrates an example of the sending message store buffer 112, showing a case where the message C4 is stored in the result message content according to a third embodiment of this invention.

FIG. 22 illustrates an example of message complement necessity setting which the user can designate according to a fourth embodiment of this invention.

DETAILED DESCRIPTION OF THE PREFERRED EMBODIMENTS

Figure 1:
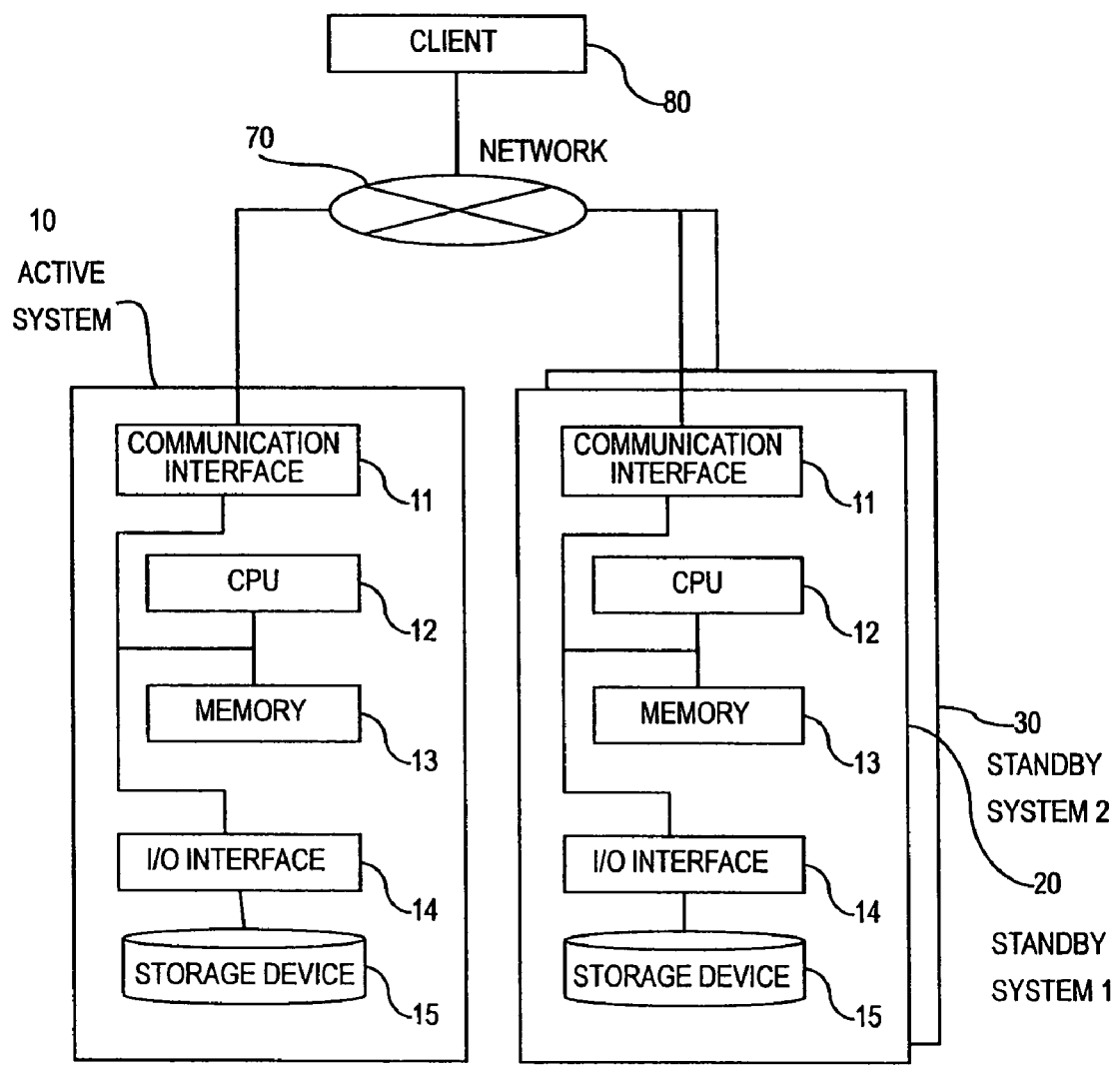
FIG. 1 is a block diagram illustrating a hardware configuration of an in-memory application system having a cluster configuration according to the first embodiment.

The preferred embodiments of this invention will be described below referring to the accompanying drawings.

First Embodiment

It should be noted that the drawings and the descriptions of this invention are simplified to show proper elements for clear understanding of this invention, and well-known elements are omitted without obstructing implementation of this invention. For some conventional technologies included in this technology, other elements may be desired, and/or needed to implement this invention. However, these elements of this technology are well-known, and do not serve to facilitate understanding of this invention, and thus description thereof will be omitted.

In the description below, each program may be described by a module number of an active system (or working system). Such a description may apply to a corresponding program of a standby system. For reference numerals shown in the drawings below, numbers similar to numerals in the other drawings may be used, and descriptions thereof are similar to those of the other drawings unless specified otherwise.

FIGS. 1 to 6, and FIG. 19 illustrate a first embodiment of this invention.

FIG. 1 is a block diagram illustrating a hardware configuration of an in-memory application system having a cluster configuration according to the first embodiment.

An active system 10 of the first embodiment includes a communication interface 11, a CPU (processor) 12, a memory 13, an I/O interface 14, and a locally connected storage system 15 connectable via the I/O interface 14.

The CPU 12 executes programs stored in the memory 13 to carry out various processes. The memory 13 and the storage system 15 can store the programs executed by the CPU 12 and data necessary for processing. The communication interface 11 communicates with another computer (e.g., a client or a standby system) via a network 70. The CPU 12 may include a plurality of cores to execute plural processes in parallel.

Standby systems 1 and 2 are configured as in the case of the active system.

Figure 2:
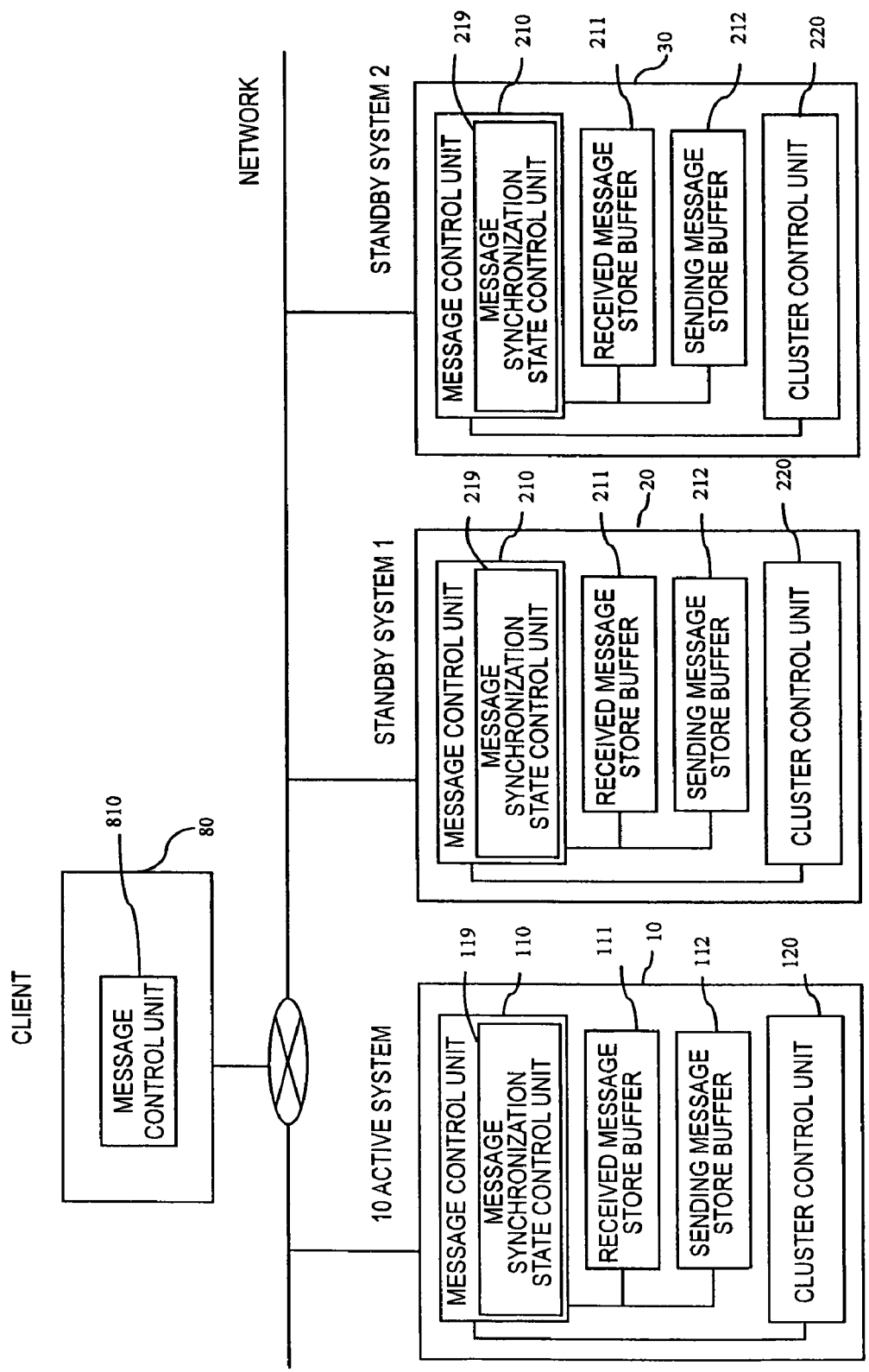
FIG. 2 is a functional block diagram mainly showing software of the in-memory application system in the physical computer shown in FIG. 1 according to the first embodiment.

FIG. 2 is a functional block diagram mainly showing software of the in-memory application system in the physical computer shown in FIG. 1. This software constitutes an in-memory application system which reads data read into the memory 13 to be executed by the CPU 12 and to be used beforehand.

A client system 80 that sends a processing request to the in-memory application system includes a message control unit 810 for sending an input message to make a processing request to the in-memory application system. The message control unit 810 has a function of receiving a response as to whether the input message has been received by the in-memory application system, and a function of receiving a processing result of the input message. The message control unit 810 further has a function of broadcasting a message to a plurality of computers such as the active system 10 and the standby systems 20 and 30 through use of multicast communication.

The active system 10 includes a message control unit 110 which has a function of receiving the input message sent by the message control unit 810 of the client system 80, and a function of receiving an input message receive notification from the standby system. The message control unit 110 includes a received message store buffer 111 for storing the received input message. The message control unit 110 has a function of sending a message to the client system 80 and the standby systems 20 and 30, and includes a sending message store buffer 112 for storing the message to be sent. The message control unit 110 additionally has a function of broadcasting a message through use of multicast communication as in the case of the message control unit 810. The message control unit 110 further has a function of identifying optional active and standby systems which employ a cluster configuration by associating with a cluster control unit 120 described below. Accordingly, the message control unit 110 has a function of executing sending through multicast communication when a message is sent to the standby systems 20 and 30. The message control unit 110 includes a message synchronization state control unit 119 for recognizing synchronization states of the standby systems 20 and 30 with respect to the input message stored in the received message store butter 111. The message synchronization state control unit 119 has a function of storing the synchronization states together in the store buffers 111 and 112 via the message control unit 110 after reception of a recognition result of the synchronization states. The message control unit 110 may include a software module for executing a processing request contained in the received message.

The active system 10 includes the cluster control unit 120 for managing which of the physical computers is an active system or a standby system. To manage which of an active system and a standby system the other computer is, the cluster control unit 120 may have a function of executing mutual communication with the other computer which employs a cluster configuration. The cluster control unit 120 additionally has a function of detecting a fault in the other system.

In the standby systems 20 and 30, software similar in configuration to the active system 10 is implemented. The standby system 30 is identical in software configuration to the standby system 20, and thus the standby system 20 will be described below. The standby system 20 includes a message control unit 210 for receiving a message multicast-sent from the client system 80. The message control unit 210 includes a received message store buffer 211 for storing the input message received from the client system 80 or the other system. The message control unit 210 has a function of sending input message receive to the active system 10 after reception of the input message. The message control unit 210 has a function of sending a message to the client system 80, another active system 20, and the standby system 30, and includes a sending message store buffer 212 for storing the message to be sent. The message control unit 210 of the standby system 20 includes a message synchronization state control unit 219 as in the case of the active system 10. The message control unit 210 has a function of executing multicast communication when communication is carried out with the other computer constituting a cluster. The standby system 20 includes a cluster control unit 220 for managing which of the physical computers is an active system 10 or a standby system 20 or 30. To manage which of the active system and the standby system 20 or 30 the other computer is, the cluster control unit 220 may have a function of executing mutual communication with the other computer which employs a cluster configuration. The cluster control unit 220 additionally has a function of detecting a fault in the other system. The cluster control unit 220 of each of the standby systems 20 and 30 has a function of executing, when a fault occurs in the active system 10, failover to operate one of the working standby systems 20 and 30 as an active system.

Figure 3:
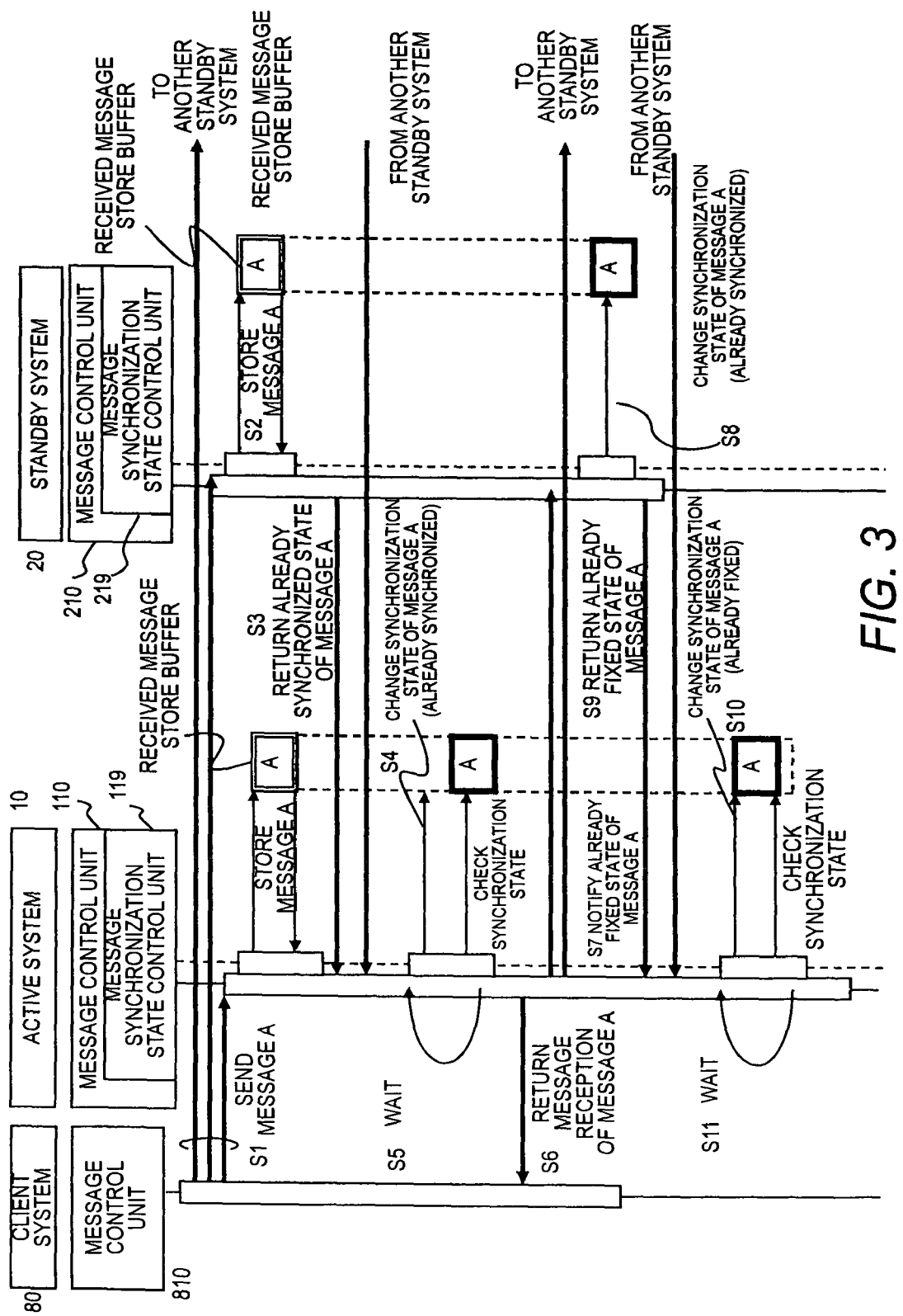
FIG. 3 is a sequence diagram illustrating a process of replicating an input message sent from the outside by the software of the in-memory application system according to the first embodiment.

FIG. 3 is a sequence diagram illustrating a process of replicating an input message sent from the outside (client system 80) by the software of the in-memory application system according to the first embodiment. The other embodiments will be described by using similar sequence diagrams. It should be noted that these sequence diagrams are designed to facilitate understanding of the replication process of the input message A, and processes other than the replication process of the message A are simplified.

In FIG. 3, the message control unit 810 of the client system 80 sends the input message A to the active system 10 and the standby systems 20 and 30 (S1). The active system 10 and the standby systems 20 and 30 store the message A in the received message store buffers 111 and 211. The message A is stored via the message synchronization state control units 119 and 219. In each of the standby systems 20 and 30, a synchronization state of the message A of its own system is stored as already synchronized (S2).

In each of the standby systems 20 and 30, after the message storage, an already synchronized response is sent to the active system (S3). In the active system, after reception of the already synchronized response from each of the standby systems 20 and 30, a process of changing synchronization states of the source standby systems 20 and 30 to already synchronized states is repeated via the message synchronization state control unit 119 (S4).

Then, the process waits until the standby systems 20 and 30 are set in already synchronized states (S5). After setting of the standby systems 20 and 30 in the already synchronized states, a message A receive notification is sent to the client system 80 (S6). The active system 10 sends to the standby systems 20 and 30 an already fixed state notification indicating that the message A can be executed by the active system 10 with respect to the standby systems 20 and 30 (S7).

After reception of this already fixed state notification, the standby systems 20 and 30 change the synchronization states of the standby systems 20 and 30 to already synchronized states with respect to the stored message A to fix the message A (S8). Then, the standby systems 20 and 30 return message A already fixed state responses to the active system (S9). As in the case of the already synchronized state response, after reception of the already fixed state responses from the standby systems 20 and 30, the active system 10 changes the synchronization states of the standby systems 20 and 30 to already fixed states (S10), waits for already fixed state responses from the standby systems 20 and 30 (S11), and receives all the responses, thereby completing the replication of the input message A.

Figure 4:
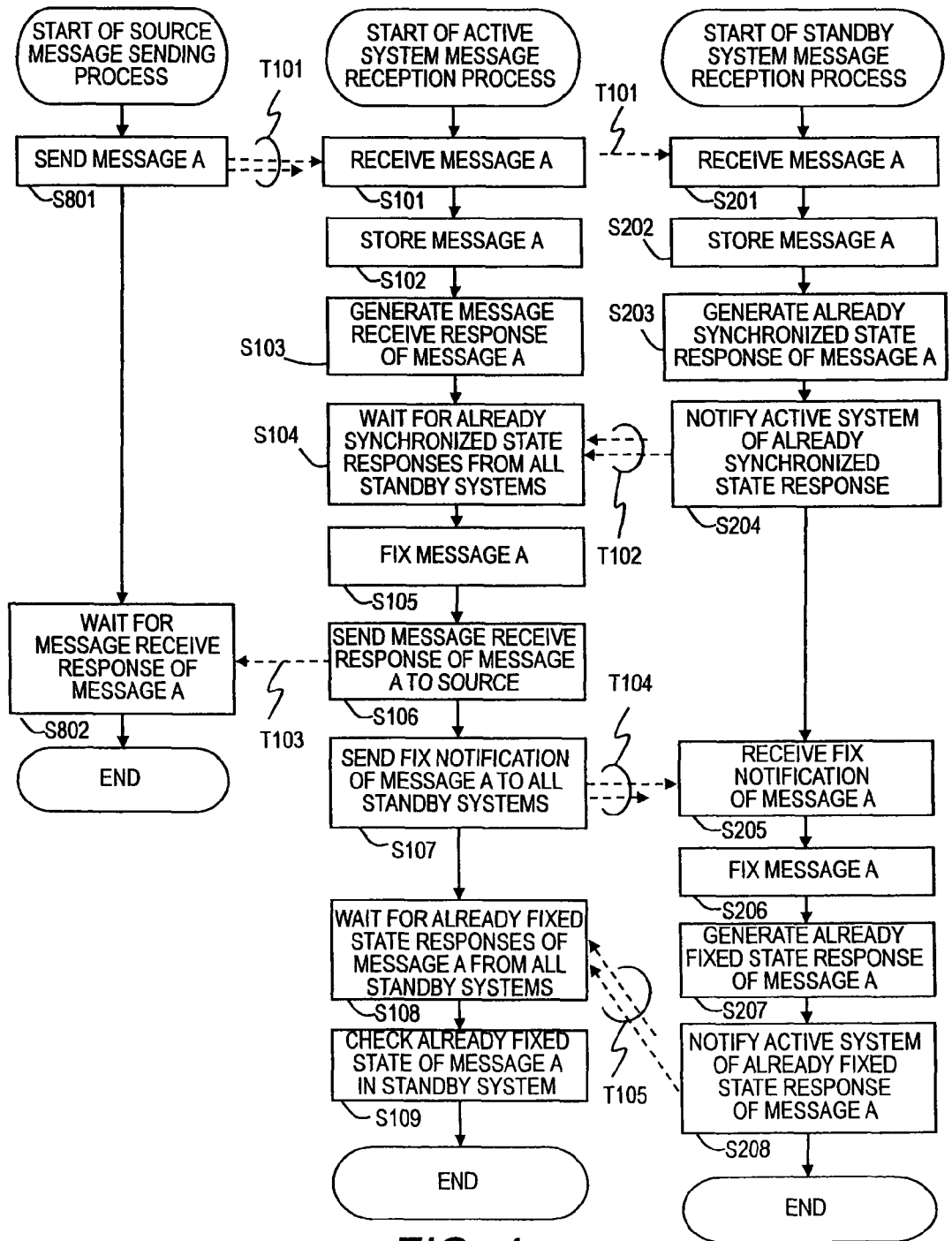
FIG. 4 is a flowchart illustrating an example of the replication process of the input message shown in FIG. 3 according to the first embodiment.

FIG. 4 is a flowchart illustrating an example of the replication process of the input message shown in FIG. 3. In the description below, operations of the standby systems 20 and 30 are shown by one computer, but a process of the other standby system is similar.

Figure 5A:
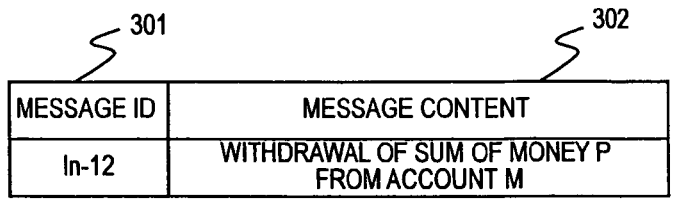
FIG. 5A illustrates an example of the message A according to the first embodiment.

First, a source of an input message to the in-memory application system, for example, the message control unit 810 of the client system 80 sends a message A as an input message to the active system 10 and the standby systems 20 and 30 through multicast communication S801, T101). FIG. 5A illustrates an example of the message A. In FIG. 5A, the message includes, for example, a message ID 301 for uniquely identifying the message, and a message content 302 for indicating a process requested to the in-memory application system. The message may include, in addition to the above information, identification information for indicating a source. When a mechanism of resending a message from the source is provided, the message may include information indicating the number of resending times.

The active system 10 and the standby systems 20 and 30 receive the message A (S101, S201) to store the already received message A in the received message store buffers 111 and 211 (S102, S202).

Figure 6:
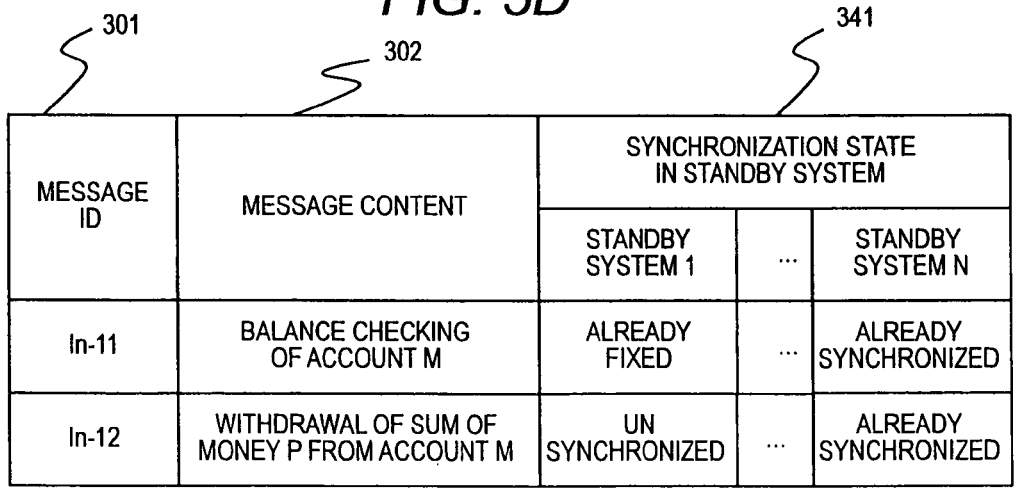
FIG. 6 illustrates an example of the received message store buffer 111 according to the first embodiment.

FIG. 6 illustrates an example of the received message store buffer 111. FIG. 6 includes, for example, in addition to the pieces of information (message ID 301 and message content 302) contained in the message A, a synchronization state 341 indicating a state of the message A in the standby systems 20 and 30. The synchronization state 341 includes, for each of the standby systems 20 and 30, pieces of information regarding an unsynchronized state before the standby system receives the message A, a synchronization state after reception, and an already fixed state indicating whether the standby systems 20 and 30 have recognized reception of the message at the standby systems 20 and 30. For example, when the active system stored in the message A in the step S102, whether all the standby systems 20 and 30 have received the message A is yet to be confirmed. Thus, synchronization states 341 of all the standby systems are unsynchronized states.

On the other hand, when the standby systems 20 and 30 store the message A in the received message store buffers 211 in the step S202, synchronization states 341 of own standby systems 20 and 30 are already synchronized states. However, synchronization states of the other standby systems are unsynchronized states.

After the step S102, the active system 10 generates a message receive response to send a message A receive notification to the source (client system 80), and stores the message receive response in the sending message store buffer 112 (S103).

After the step S202, the standby systems 20 and 30 generate an already synchronized state response to send the message A receive notification to the active system 10, and stores the already synchronized state response in the sending message store buffer 212 (S203).

Figure 5B:
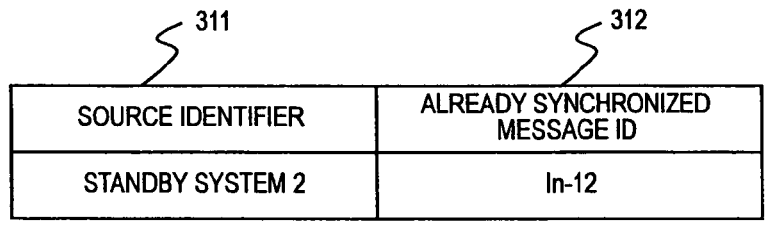
FIG. 5B illustrates an example of the already synchronized state response according to the first embodiment.
Figure 5C:
FIG. 5C illustrates an example of the message receive response according to the first embodiment.

FIG. 5B illustrates an example of the already synchronized state response. FIG. 5B includes an already received message ID (already synchronized message ID) 312, and a source identifier 311 for uniquely identifying each of the source standby systems 20 and 30. FIG. 5C illustrates an example of the message receive response. FIG. 5C includes, for example, a received message ID. The message receive response may include, to enable the client system 80 to recognize which of the computers the active system is, information for uniquely identifying the source active system as in the case of FIG. 5B.

After the step S203, the standby systems 20 and 30 notify the active system 10 of the stored already synchronized state response (S204, T102). The active system 10 waits, after the step S103, for arrival of the already synchronized state responses from all the standby systems 20 and 30 (S104). For example, the step S104 may be executed by changing, when the already synchronized state responses are received, for the message of the already synchronized message ID 301 included in the response among the messages held in the received message store buffer 111 shown in FIG. 6, the synchronization states 341 of the standby systems 20 and 30 corresponding to the source identifiers to already synchronized states, and checking whether the synchronization states 341 of the standby systems are already synchronized states.

After reception of the already synchronized state responses from the standby systems, the active system 10 can fix already synchronized states in the standby systems 20 and 30 for the message A. In other words, replication of the message A in the standby systems 20 and 30 can be fixed (S105). After the step S105, for example, in the active system 10, the message A whose already synchronized state has been fixed may actually be executed according to the message content, or a part or all the message contents may be sent to another computer. After the step S105, the message A receive response stored in the step S103 is sent to the source (S106, T103). The source (client system 80) receives the message receive response T103 (S802), thereby completing the sending process of the message A.

Figure 5D:
FIG. 5D illustrates an example of a message fix notification according to the first embodiment.

The active system 10 generates a message fix notification to notify the standby system of synchronization of the message A at the standby systems, stores the message fix notification in the sending message store buffer 112, sends the notification to the standby systems 20 and 30 (S107, T104) through multicast communication, and then waits for message already fixed state responses which are responses to the message fix notification T104 from the standby systems 20 and 30 (S108). The message fix notification T104 contains, for example, as in the case of the message T102, a fixed message ID fixed by the active system 10 as shown in FIG. 5D. FIG. 5D illustrates an example of a message fix notification.

After the step S204, after reception of the message fix notification T104 (S205), the standby systems 20 and 30 fix the message A (S206). For example, the step S206 is executed by changing, when the message fix notification T104 has been received, the synchronization states 341 of the standby systems 20 and 30 of the already synchronized message ID contained in the message fix notification T104 among the messages held in the received message store buffer 211 to already synchronized states. Thus, the standby systems 20 and 30 can fix replication of the fixed message A in the standby systems 20 and 30 including an own system. Moreover, the standby systems 20 and 30 can recognize a start of a process executed by the active system 10 after fixing of the message A as described above.

The standby systems 20 and 30 recognize the fixed message A. Therefore, when failover occurs due to a fault in the active system 10, the failover destination standby systems 20 and 30 can recognize that the message A is a message currently processed in the active system 10 and targeted for recovery.

After the step S206, the standby systems 20 and 30 generate message already fixed state responses themselves, store the responses in the sending message buffers 212 (S207), and notify the active system 10 of the message already fixed state responses (S208, T105), thereby completing the message reception process. The message T105 may contain, for example, as in the case of the messages T102 and T103, message IDs fixed in the standby systems 20 and 30, and information uniquely indicating a source.

After the step S107, the active system 10 waits for arrival of the already fixed state responses T105 from the standby systems 20 and 30 (S108). For example, the step S108 may be executed by changing, when the already fixed state responses T105 have been received, for messages of the already fixed state message IDs contained in the responses among the messages held in the received message store buffer 111, the synchronization states of the standby systems 20 and 30 corresponding to the source identifier to already fixed states, and checking whether the synchronization states of all the standby systems 20 and 30 have been fixed. Reception of the already fixed state responses from all the standby systems 20 and 30 in the step S108 enables checking of already fixed states of the input message in the standby systems 20 and 30 (S109), thereby completing the message reception process in the active system 10.

Thus, when a fault occurs in the active system 10, taking-over of an application by the replicated message A is guaranteed in the standby systems 20 and 30. The example where the client system 80 sends data to the active system 10 and all the standby systems 20 and 30 through multicast communication has been described. However, this multicast communication may be realized by multicast-sending a message unicast-communicated by the client system 80 through a router (not shown) in the network between the client system 80 and the active/standby systems 20 and 30. The multicast communication may also be realized by combing a plurality of multicast communications, or substituting a part or all multicast communications with unicast communication. Accordingly, even when the number of standby systems is one, or when standby systems are distributed over different networks, the input message can be replicated.

A timing of executing the step S103 may be different if the step is before the step S106 of sending the message T103 and after the step S102.

Figure 7:
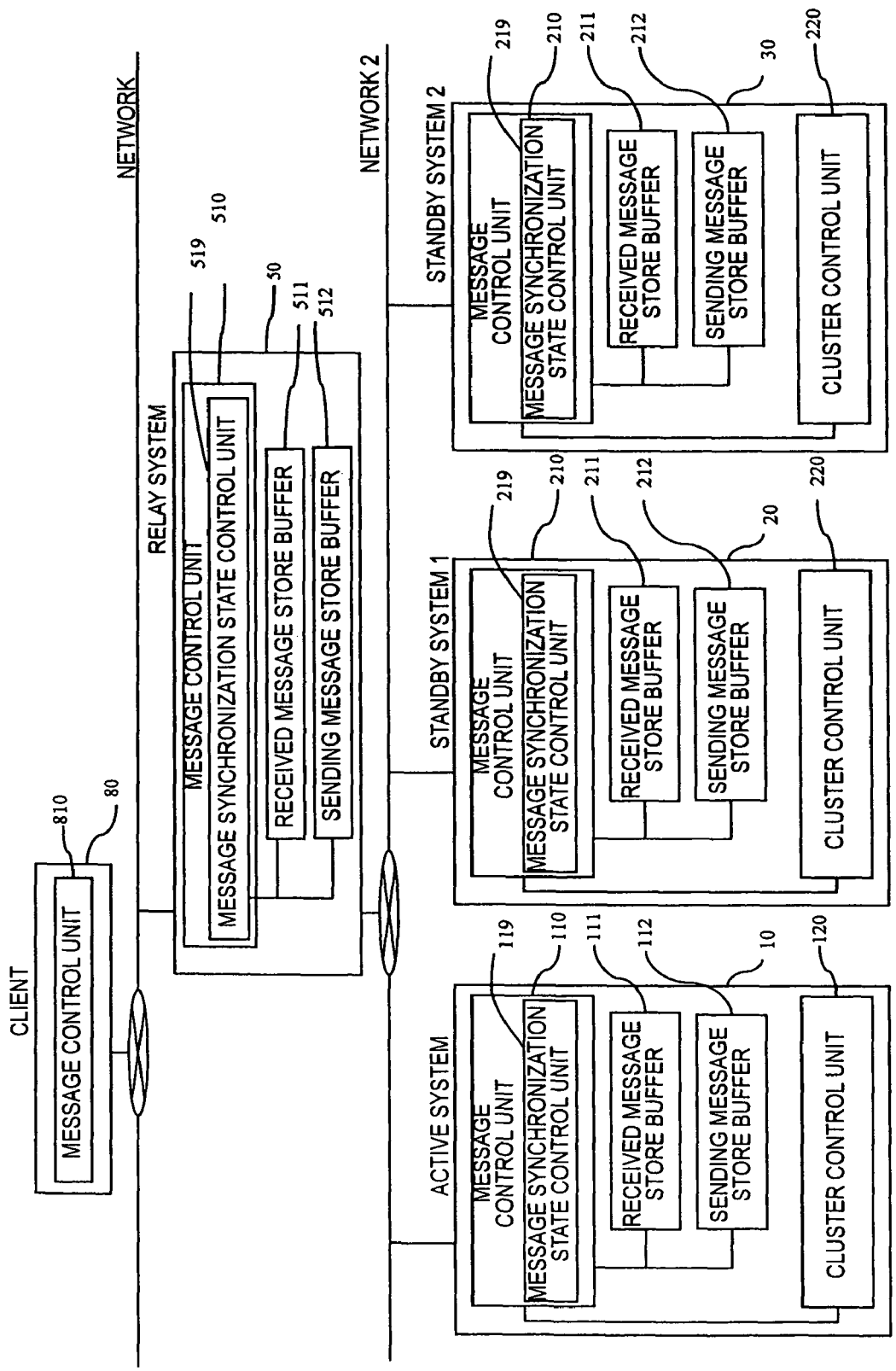
FIG. 7 is a block diagram illustrating the system configuration where an operation described as the operation of the client system in FIG. 4 is executed by the relay system according to the first embodiment.

As another system configuration of realizing the first embodiment, for example, as shown in FIG. 7, a system configuration that includes a relay system 50 between the client system 80 and the in-memory application system may be employed.

FIG. 7 is a block diagram illustrating the system configuration where an operation described as the operation of the client system 80 in FIG. 4 is executed by the relay system 50. In FIG. 7, for example, the system may be configured as follows. The client system 80 sends an input message only to the relay system 50. In the relay system 50, a message control unit 510 stores the input message in a received message store buffer 511, stores the input message in a sending message store buffer 512, and then sends the input message to the active system 10 and all the standby systems 20 and 30 through multicast communication.

After the step S802, the message receive response received in the step S802 is transferred to the client system 80, thereby enabling notification of the message receive response to the client system 80.

This embodiment has been described by way of case where the message fix notification T104 is executed for each message. However, to further reduce the number of communication times, a method for sending a plurality of message fix notifications en bloc by execution for each message of a certain amount or by notification at a certain interval may be used.

Through the series of processes shown in FIGS. 1 to 7, data replication of the input message from the client system 80 to the in-memory application system can be realized by combining the multicast communication with the message receive responses from the standby systems 20 and 30. As a result, replication of the input message to the standby systems 20 and 30 can be realized by the smaller number of communication times as compared with a case where the active system 10 which has received the input message transfers the message to the standby systems 20 and 30 through multicast communication.

Second Embodiment

FIG. 8, FIGS. 9A to 9C, and FIG. 10 illustrate a second embodiment of this invention, which is realized by partially changing the first embodiment.

Figure 10:
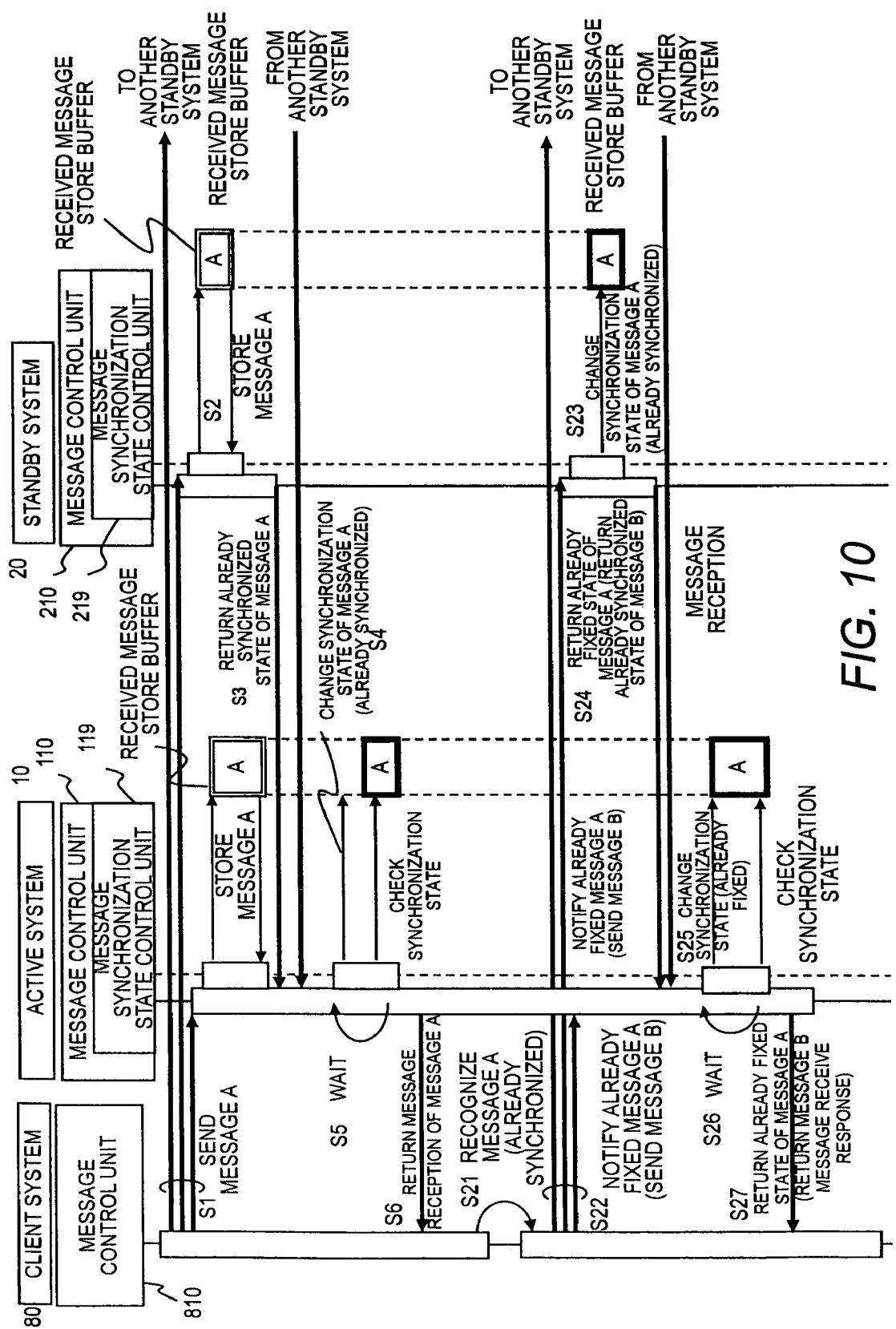
FIG. 10 is a sequence diagram illustrating a process carried out by software of an in-memory application system according to a second embodiment of this invention.

FIG. 10 is a sequence diagram illustrating a process carried out by software of an in-memory application system of the second embodiment to replicate an input message sent from the outside, which is a partial change of the sequence of the first embodiment shown in FIG. 3.

In FIG. 10, the sequence from sending of an input message A from a client system 80 to reception of a message receive response of the message A at the client system 80 (S1 to S6) is similar to that of FIG. 3.

After reception of the message receive response of the message A (S6), the client system 80 recognizes that the message A has been already synchronized at an active system 10 and standby systems 20 and 30 (S21). Then, when sending a new input message B to the active system 10 and the standby systems 20 and 30, the client system 80 sends a fix notification of the message A together with the message B (S22). In the standby systems 20 and 30, after reception of the message B and the message A fix notification, synchronization states of the standby systems 20 and 30 are changed to already synchronized states for the stored message A, thereby fixing the message A (S23). The message A already fixed state response is returned together with an already synchronized state response of the input message B to the active system 10 (S24).

After reception of the message A already fixed state responses from the standby systems 20 and 30, as in the case of the already synchronized state response, the active system 10 changes synchronization states of the standby systems 20 and 30 to already fixed states (S25), and waits for already fixed state responses from the standby systems 20 and 30 (S26).

After reception of all the responses, the active system 10 returns the message A already fixed state response together with a message receive response of the input message B to the client system 80 (S27). Thus, replication of the input message A is completed, thereby fixing the message receive response of the message B.

Figure 8:
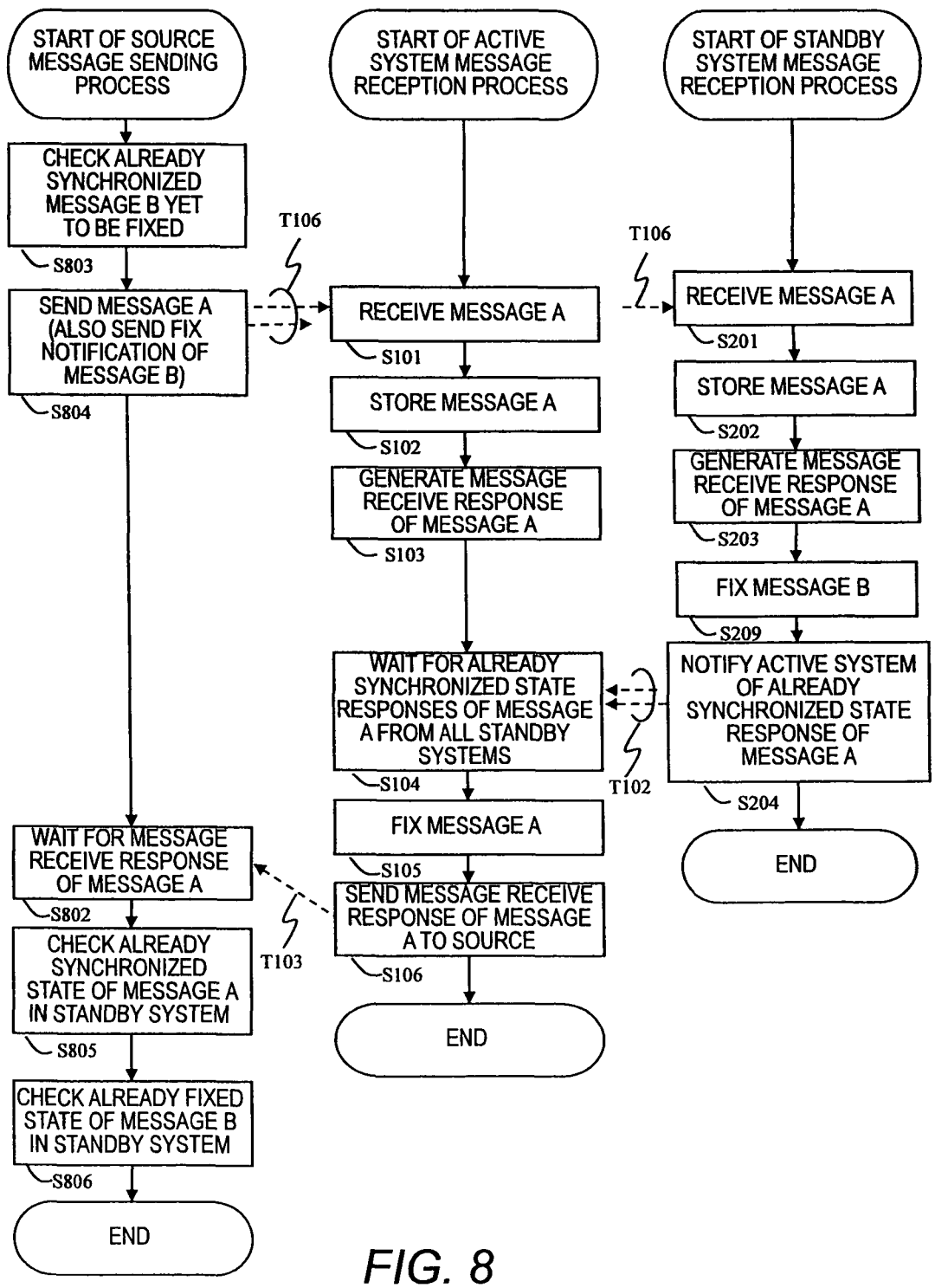
FIG. 8 is a flowchart illustrating an example of the replication process of the input message shown in FIG. 10 according to a second embodiment of this invention.

FIG. 8 is a flowchart illustrating an example of the replication process of the input message shown in FIG. 10.

In the client system 80 which is an input message source, a message control unit 810 refers to presence of a message B whose fixing is yet to be notified to the in-memory application system among already synchronized messages whose message receive responses have been received (S803), and sends a fix notification of the message B similar to the step T104 at the time of sending the message A which is an input message (S804, T106). Then, as in the case of the step S802, the message control unit 810 receives a message receive response of the message T106. Through the step S802, the message control unit 810 checks an already synchronized state of the message A which is an input message (S805), and further checks whether the message B sent in the message T106 has been fixed in the standby systems 20 and 30 (S806).

Figure 9A:
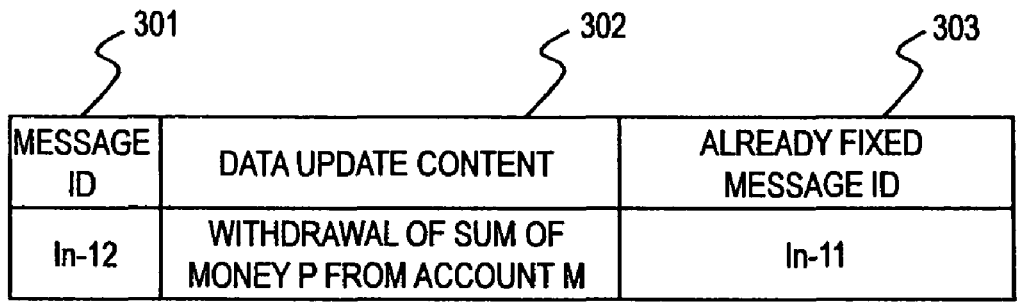
FIG. 9A illustrates an example of the message according to a second embodiment of this invention.

FIG. 9A illustrates an example of the message T106, which includes a fixed message ID 303 for identifying the already synchronized message B yet to be notified in addition to those items of FIG. 5A.

The steps S803 to S806 may be realized by providing a message synchronization state control unit in the message control unit 810 of the client system 80, and storing a message ID whose reception response has been received by this message synchronization state control unit in a memory or a disk device in a table form. For example, as an example of execution in the memory, a method for providing a buffer for storing a sent input message and changing a synchronization state of the sent message by the message synchronization state control unit as in the case of a received message store buffer is available. When the client system 80 sends the input message after reception of a message receive response of a last input message, through use of a message ID for uniquely defining a message ID of an input message sent immediately before and synchronized from the input message ID, the process may be realized without managing the message ID whose reception response has been received. In this case, the fixed message ID in the message T106 shown in FIG. 9A may not be sent.

In the in-memory application system, as shown in FIG. 8, first, for the message A, as in the case of the first embodiment, the active system 10 executes steps S101 to S106, the standby systems 20 and 30 execute steps S201 to S204, and a message T102 is communicated between the active system 10 and the standby systems 20 and 30. For the message B, in the standby systems 20 and 30, an already synchronized state of the message B is checked from the message T106 after the step S203, the message B is fixed as in the case of the step S206 of the first embodiment shown in FIG. 4 (S209), and the already synchronized state response T102 of the message A is sent to the active system 10 as in the case of the step S204.

Figure 9B:
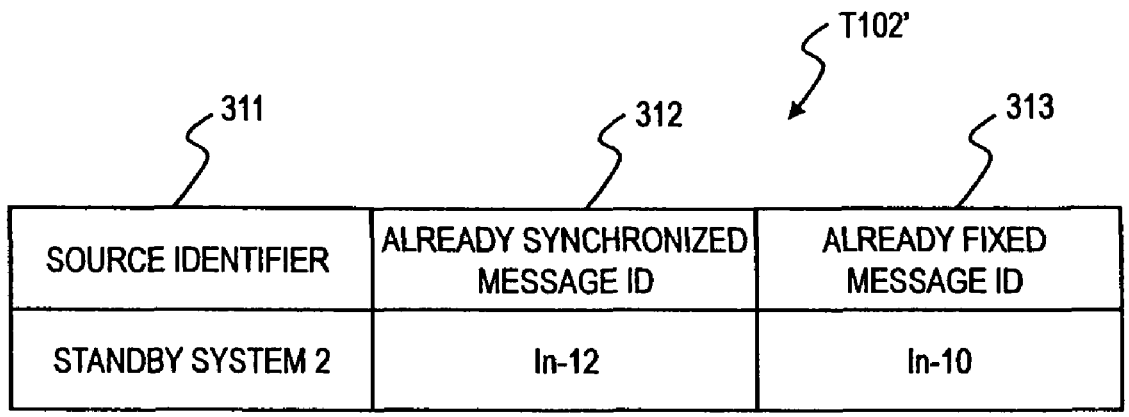
FIG. 9B illustrates another example of the message according to a second embodiment of this invention.
Figure 9C:
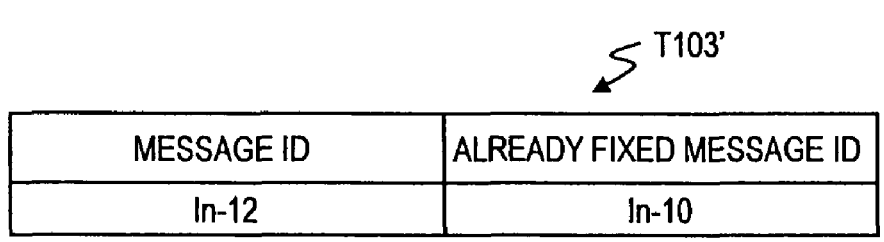
FIG. 9C illustrates another example of the message according to a second embodiment of this invention.

In the active system 10, as in the case of the step S106, the client system 80 is notified of a message receive response of the message A. The step S209 of the standby systems 20 and 30 may be executed after the step S204 of notifying the message T102. In this case, the message T102 does not contain an already fixed state response of the message B because the step is before fixing of the message B. Instead, when the standby systems 20 and 30 send a message T102 regarding a different input message after the message B is fixed in the step S209, an already fixed state response of the message B may be returned. For example, as in the case of the notification T106 regarding the notification T101, the step may be realized by sending another message form T102' shown in FIG. 9B for adding a new message ID of a fixed message B to the message T102. As in the case of FIG. 9B, the step T103 of the active system 10 may be realized by sending another message form T103' shown in FIG. 9C for adding a new message ID of a fixed message B to the message T103. The client system 80 checks, in the step S806, the already fixed state of the message B whose message T103' has been notified. FIG. 9B illustrates another example of a message according to the second embodiment.

Thus, the already synchronized state response step S204 of the input message, which is executed in the standby systems 20 and 30, can be carried out before fixing of another message. In this case, a message receive response T103 of the input message can be quickly returned to the client system 80.

The input message sent from the client system 80 may be a message of contents which make no processing requests to the in-memory application system. For example, when a next input message has not been sent, to notify the in-memory application system of the already synchronized message notified by the message T103, the input message containing no processing request may be sent. In the active system 10 and the standby systems 20 and 30, when there are no processing contents of an input message, the storage process of the input message may be omitted. A timing of sending the input message containing no processing request from the client system 80 may be optional. For example, the timing is when a next input message has not been sent for a certain period, when sent at a certain interval, or a combination of both.

As in the case of the first embodiment shown in FIG. 7, the second embodiment can also be realized by a system configuration which includes a relay system 50 between the client system 80 and the in-memory application system. For example, as in the case of the first embodiment, the system may be configured as follows. An input message is sent from the client system 80 to the relay system 50. The relay system 50 carries out the source message sending process shown in FIG. 8, and transfers a message receive notification of the input message to the client system 80. Alternatively, the client system 80 carries out the source message sending process shown in FIG. 8, and the relay system 50 transfers communications between the client system 80 and the in-application system. In this case, the message T106 is sent from the client system 80 to the relay system 50 through unicast communication, and the relay system 50 sends the message to the active system 10 and the standby systems 20 and 30 through multicast communication.

Through the series of processes shown in FIGS. 8 to 10, data replication of the input message from the client system 80 to the in-memory application system can be realized by only a process of multicast communication from the client system 80. As a result, as in the case of the first embodiment, replication of the input message to the standby systems 20 and 30 can be realized by reducing the number of communication times more as compared with a case where the active system 10 which has received the input message transfers the message to the standby systems 20 and 30 through multicast communication. Moreover, use of the same communication mechanism as that of the input message eliminates the necessity of functions for multicast communication from the active system 10 to the standby systems 20 and 30.

Third Embodiment

FIGS. 11 to 14 illustrate a third embodiment of this invention, which is realized by partially changing the first embodiment.

Figure 11:
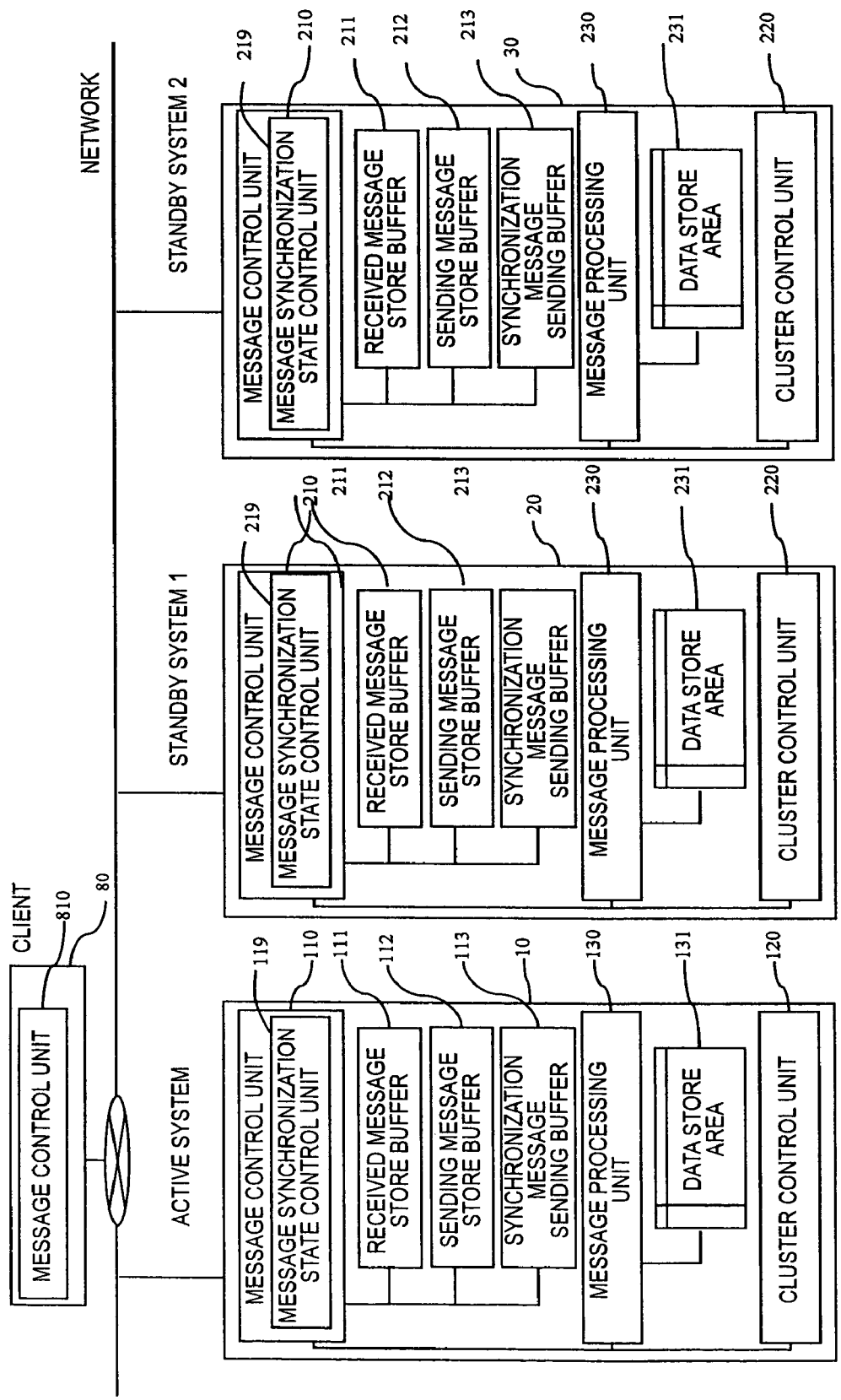
FIG. 11 is a block diagram mainly illustrating software of an in-memory application system according to a third embodiment.

FIG. 11 is a block diagram mainly illustrating software of an in-memory application system according to a third embodiment realized by partially changing the first embodiment shown in FIG. 2. Each system of FIG. 11 has, in addition to those of the system of the first embodiment shown in FIG. 2, functions described below.

An active system 10 includes a message processing unit 130 for executing a processing request of an input message whose copies are present in standby systems 20 and 30 by a message control unit 110. The message processing unit 130 includes a data store area 131 necessary for executing the processing request of the input message. The processing request contains, for example, a referring process or an updating process of the data store area 131. When the processing request is an updating process, the message processing unit 130 has, in addition to a function of updating the data store area 131, a function of sending information regarding the updating process, as a synchronization message to the standby systems 20 and 30 via the message control unit 110. The message control unit 110 includes a synchronization message sending buffer 113 for storing the synchronization message. A message synchronization state control unit 119 includes a function of recognizing synchronization states of the standby systems 20 and 30 with respect to the synchronization message stored in the synchronization message sending buffer 113 to store the synchronization states.

As in the case of the active system 10, each of the standby systems 20 and 30 includes a message processing unit 230, a data store area 231, and a synchronization message sending buffer 213. A message control unit 210 of each of the standby systems 20 and 30 has a function of storing a synchronization message sent from the message control unit 110 of the active system 10 in the synchronization message sending buffer 213. The message processing unit 230 further has a function of reflecting the processing result of the active system 10 in the data store area 231 based on the synchronization message stored in the synchronization message sending buffer 213.

Figure 12:
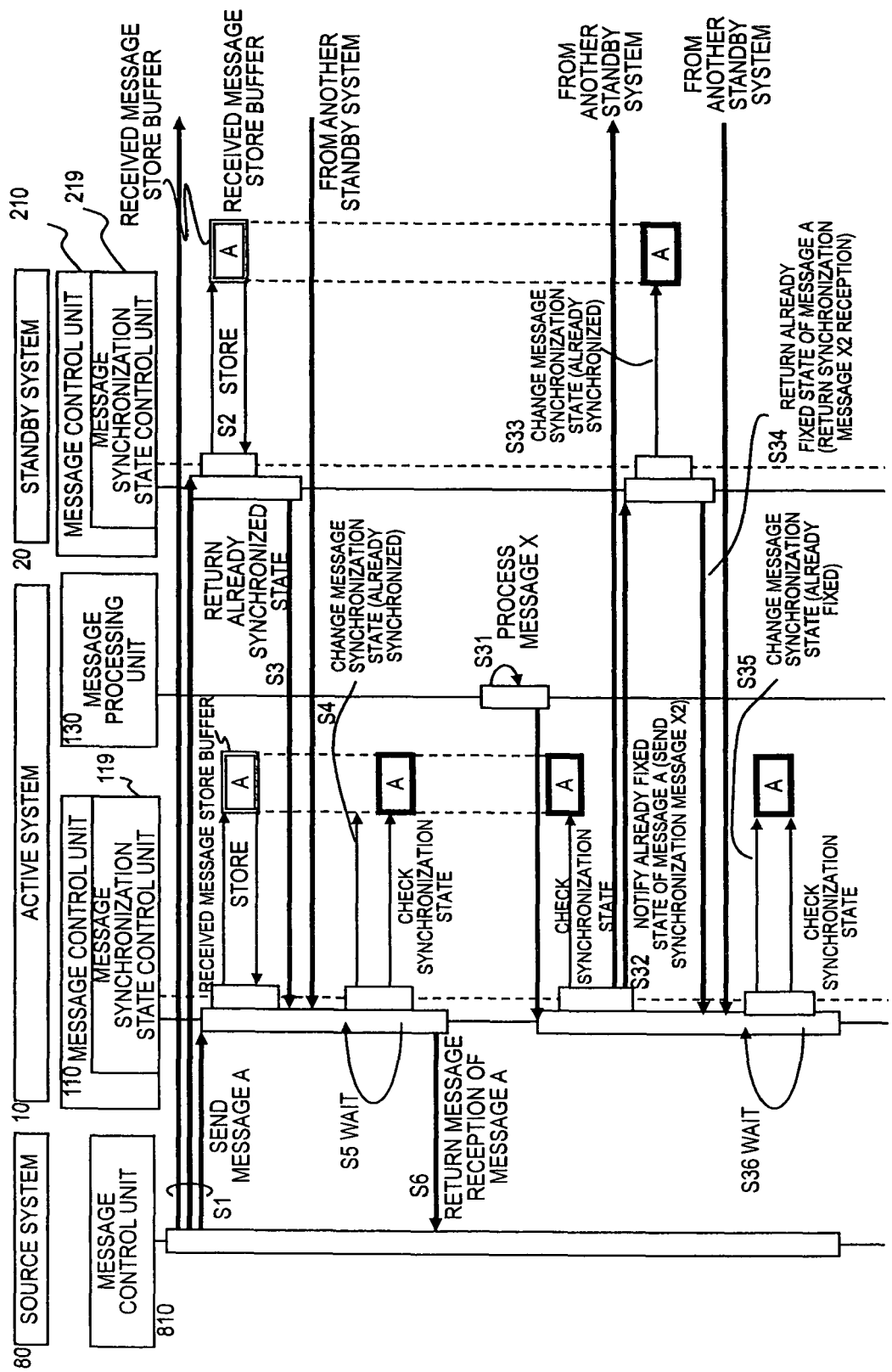
FIG. 12 is a sequence diagram illustrating a process executed by the software of the in-memory application system of the third embodiment.

FIG. 12 is a sequence diagram illustrating a process executed by the software of the in-memory application system of the third embodiment to replicate an input message sent from the outside, which is realized by partially changing the sequence of the first embodiment shown in FIG. 3.

In FIG. 12, the sequence from sending of an input message A from a client system 80 to reception of a message receive response of the message A at the client system 80 (S1 to S6) is similar to that of the first embodiment shown in FIG. 3.

Then, the active system 10 has been already synchronized with the standby systems 20 and 30, processes a processable input message X by the message processing unit 130 (S31), and sends the processing result as a synchronization message X2 to the standby systems 20 and 30 to synchronize the processing results (S32). In the step S32, the active system 10 checks the message A already synchronized in the standby systems 20 and 30 before sending of the synchronization message X2, and sends a message A fix notification together with the synchronization message X2.

In the standby systems 20 and 30, after reception of the message A fix notification, synchronization states of the standby systems 20 and 30 are changed to already synchronized states for the stored message A to fix the message A (S33). Then, a message A already fixed state response is returned together with a message receive response of the synchronization message X2 to the active system 10 (S34).

As in the case of the already synchronized state response, after reception of already fixed state responses from the standby systems 20 and 30, the active system 10 changes synchronization states 341 of the standby systems 20 and 30 to already fixed states (S35) to wait for already fixed state responses from the standby systems 20 and 30 (S36). After reception of all the responses, the active system 10 returns the message A already fixed state response together with a message receive response of an input message B to the client system 80. Thus, replication of the input message A is completed.

Figure 13:
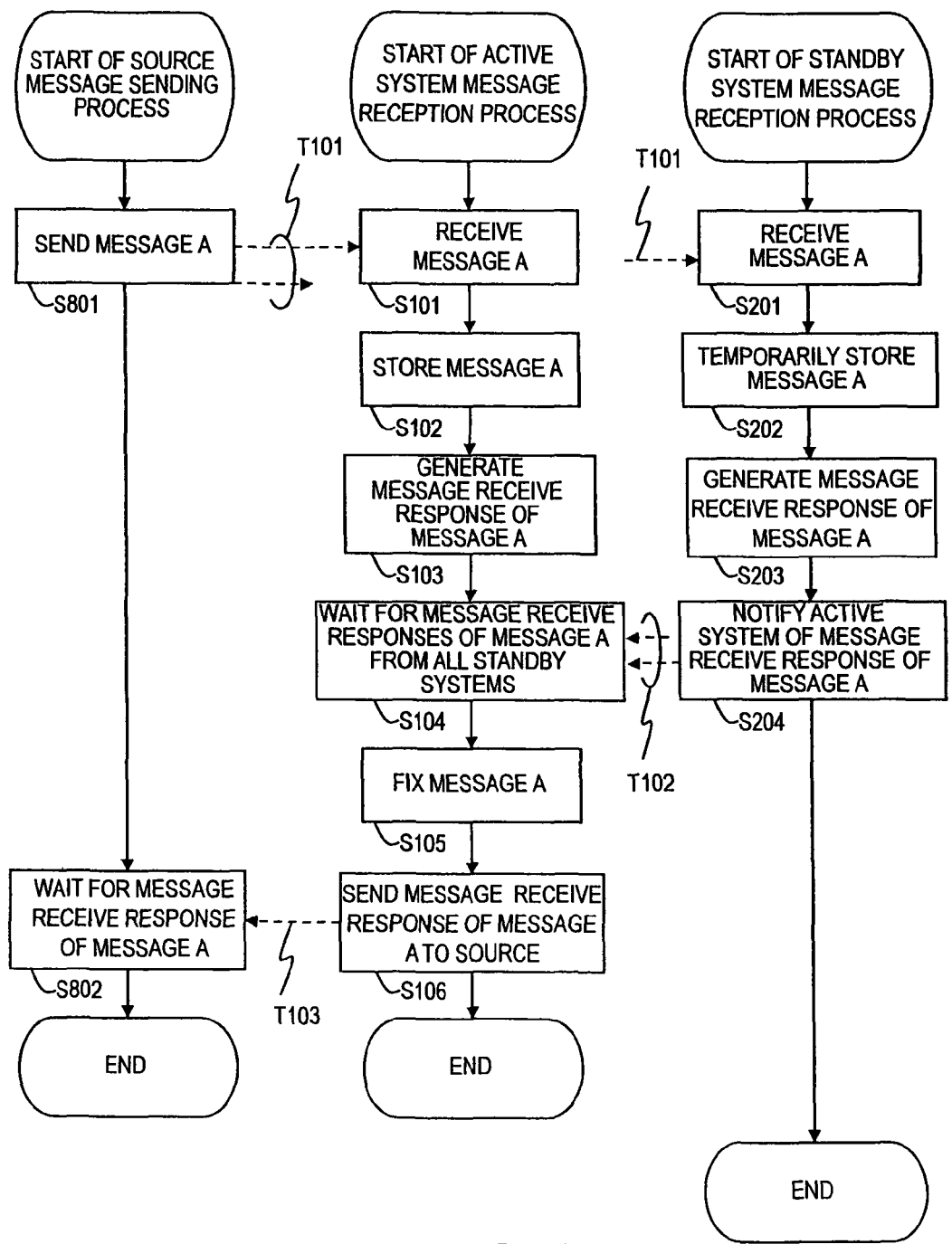
FIG. 13 is a flowchart illustrating an example of a process up to fixing of synchronization of an input message sent from the outside in the standby systems in the replication process of the input message according to a third embodiment of this invention.
Figure 14:
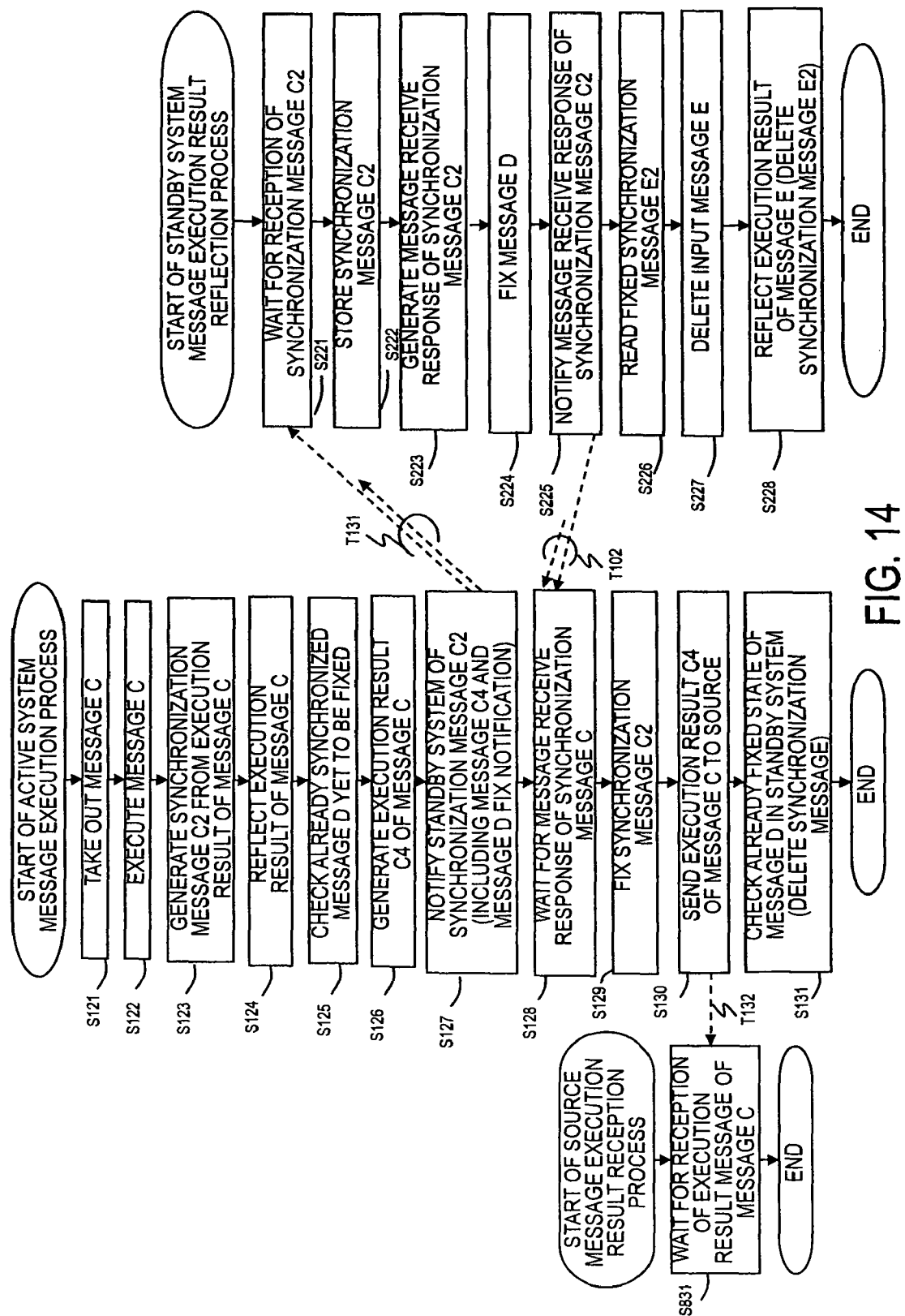
FIG. 14 is a flowchart illustrating an example of a process of fixing an input message in the standby systems when the active system processes the processing requests, and replicates the processing result to the standby systems in the replication process of the input message according to a third embodiment of this invention.

FIGS. 13 and 14 are flowcharts each illustrating an example of the replication process of the input message shown in FIG. 12. FIG. 13 is a flowchart illustrating an example of a process up to fixing of synchronization of an input message sent from the outside in the standby systems 20 and 30 in the replication process of the input message, which is realized by partially changing the first embodiment shown in FIG. 4. In FIG. 13, in the standby systems 20 and 30, after reception of the input message, the steps S201 to S204 are executed as in the case of the first embodiment of FIG. 4. The active system 10 executes, as in the case of the first embodiment, the steps S101 to S106.

FIG. 14 is a flowchart illustrating an example of a process of fixing an input message in the standby systems 20 and 30 when the active system 10 processes the processing requests, and replicates the processing result to the standby systems 20 and 30 in the replication process of the input message.

In FIG. 14, the message processing unit 130 of the active system 10 takes out an input message made executable in the step S106 (S121). For example, an example where a message C different from the input message A received in FIG. 13 has been taken out will be described below.

The active system 10 carries out the process based on a processing request of the taken-out message C (S122). The active system 10 generates a synchronization message C2 to reflect an execution result of the message C of the step S122 in the data store areas of the standby systems 20 and 30, stores the message in the synchronization message sending buffer 113 (S123), and then reflects the execution result in the data store area 131 (S124).

As in the case of the step S803 shown in FIG. 8, in the standby systems 20 and 30, whether an already synchronized message D yet to be fixed is present is checked (S125). The already synchronized message D may contain, in addition to the input message processed in FIG. 13, the synchronization message itself sent to the standby systems 20 and 30 as described in detail below, or all target messages when the number of target messages is plural. An execution result message C4 to return a processing result of the message C to the input message source is generated to be stored in the sending message store buffer (S126). The synchronization message C2 is sent together with the message C4 generated in the step S126 and information of the message D checked in the step S125 to the standby systems 20 and 30 through multicast communication (S127, T131).

FIG. 15B illustrates an example of the execution result message C4 (message T132) generated in the step S126, which contains, for example, a message ID 1321 for uniquely indicating a result message, and a message content 1322 for indicating a processing result. The message ID 1321 has a number similar to a message ID 1301 of a processed input message. Accordingly, which of the input messages has been processed, and a result of the processing can be notified together. In this case, the message ID of the input message may be sent.

FIG. 15A illustrates an example of the message T131 to be sent in the step S127, which includes, for example, a synchronization message C2 containing a message ID 1301 for uniquely indicating a synchronization message and a message processing result content 1304 for indicating information where the data store area is updated based on the processing result. The message C4 and a message ID 1303 of the already synchronized message yet to be fixed which is extracted in the step S125 are also included.

FIG. 16A illustrates an example of the synchronization message sending buffer 113 at the time of sending the message T131 in the step S127, which includes, for example, in addition to the message T131, as in the case of FIG. 6, a synchronization state 1131 indicating a reception state of a synchronization message in each of the standby systems 20 and 30. FIG. 16B illustrates an example of the sending message store buffer 112, showing a case where the message C4 is stored in the result message content.

In FIG. 14, the standby systems 20 and 30 receive the message T131 as in the case of the steps S201 to S204 of FIG. 13 (S221), stores the message T131 in the synchronization message sending buffer 213 (S222), then generates a message receive response of the synchronization message C2 stored in the step S222 (S223), and checks fixing of an already synchronized message D yet to be fixed as in the case of the step S131 (S224). Then, as in the case of the notification T102', the active system 10 is notified of the already fixed state of the message D fixed in the standby systems 20 and 30 (S225, T102'). As in the case of the steps S104 to S106, the active system 10 receives the response (S128), checks an already fixed state of the synchronization message C2 (S129), and notifies the source of the message C4 (S130).

Fixing of the already synchronized message D yet to be fixed, notified in the message T131, is checked (S131). When the fixed message D is a synchronization message in the step S131, a step of deleting the synchronization message may be included.

In the standby systems 20 and 30, when a synchronization message E2 with respect to an already synchronized input message E which has been fixed is present, the synchronization message E2 is read from the fixed already synchronized message D among the messages fixed in the step S224 (S226). The input message E executed to generate the synchronization message E2 is deleted from the received message store buffer 211 (S227). Then, a message processing result content of the synchronization message E2 is reflected in the data store area 231 to delete the synchronization message E2 from the synchronization message sending buffer (S228). Through the step S228, the data store areas 231 of the standby systems 20 and 30 are set in replicated states of the data store area 131 of the active system at the time of executing the message E.

According to this embodiment, a timing of executing the step S123 may be different if the step is before sending of the message T131.

This embodiment has been described by way of example where the already synchronized message D yet to be fixed is different from the input message A which has been synchronized immediately before, and the synchronization message E2 reflected in the standby systems 20 and 30 is different from the synchronization message X2 which has been received immediately before. However, the message D may be identical to the message A, the message E2 may be identical to the message X2, or the message X for generating the synchronization message X2 may be identical to the message D. In this case, since fixed message IDs contained in the messages T131 and 102' are message IDs uniquely calculable from the synchronization message ID, sending can be omitted, thereby further reducing the amount of communication.

Through the series of processes shown in FIGS. 11 to 16B, data replication of the input message from the client system 80 to the in-memory application system can be realized by combining multicast communication from the source with multicast communication necessary for synchronizing an execution result of the input message. Thus, as in the case of the first embodiment, replication of the input message to the standby systems 20 and 30 can be realized by reducing the number of communication times more as compared with a case where the active system 10 which has received the input message transfers the message all the standby systems 20 and 30 through multicast communication.

Fourth Embodiment

FIGS. 17 to 22 illustrate a fourth embodiment of this invention, which is realized by making additions to the third embodiment. FIGS. 17 to 22 illustrate a recovery process where when a fault occurs in an active system 10, one of standby systems 20 and 30 takes over a process of the active system 10 by failover. In the case of the third embodiment, the sending of the input message and the synchronization message to the standby systems 20 and 30 through multicast communication may create a case where synchronization states of the messages do not match each other between the standby systems 20 and 30. Thus, the recovery process of the fourth embodiment includes a consistency recovery process of eliminating synchronization state mismatching between the standby systems 20 and 30.

Figure 17:
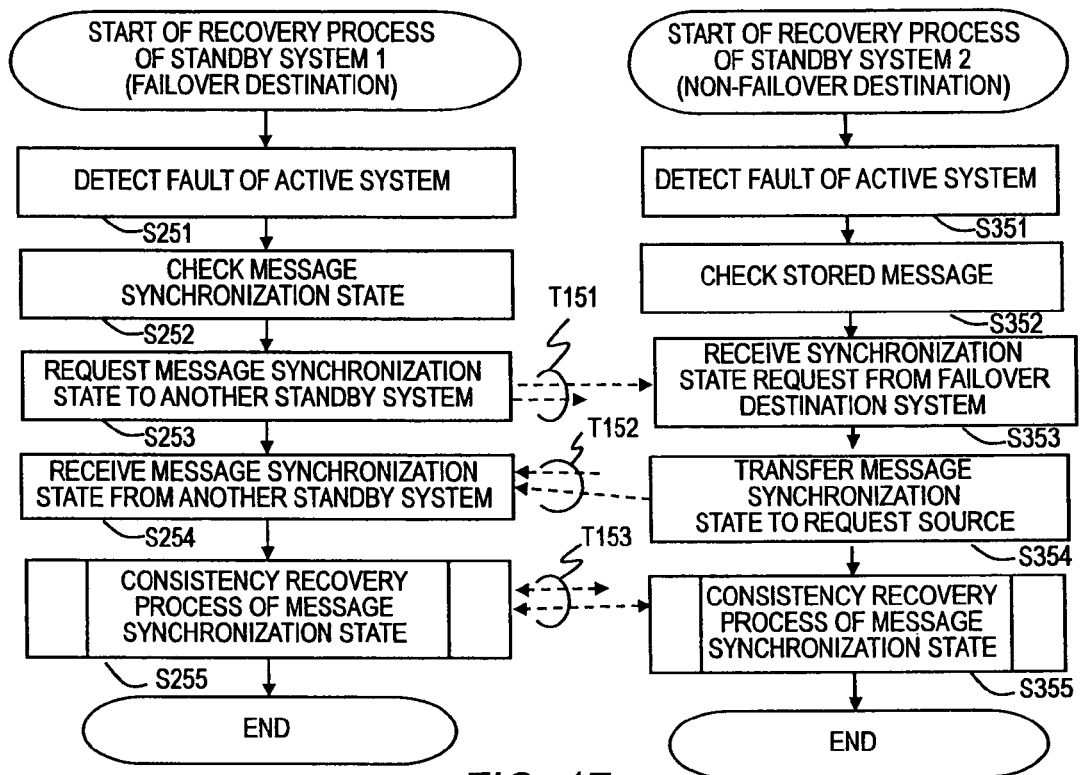
FIG. 17 is a flowchart illustrating an overall process carried out in each of the standby systems according to a fourth embodiment of this invention.

FIG. 17 is a flowchart illustrating an overall process carried out in each of the standby systems 20 and 30. In this example, the process of the active system 10 is taken over by the standby system 20 (standby system 1). Regarding a method for monitoring a fault occurrence in the active system 10 by a plurality of standby systems 20 and 30, and deciding which of the standby systems 20 and 30 is used to take over the process when a fault occurs, a well-known technology may be used. Thus, detailed description thereof will be omitted.

When a fault occurs in the active system 10, each of the standby systems 20 and 30 detects the fault by a cluster control unit 220 (S251, S351), checks a message stored in its own buffer (S252, S352), and then communicates with another (T151, T152) to receive synchronization states of the message stored in the other standby system 20 or 30 (S253, S254, S353, S354).

Subsequently, the standby system 20 which is a failover destination of the active system 10 (failover destination system hereinafter) communicates with the other standby system 30 (non-failover destination system) to execute a message synchronization state consistency recovery process of synchronizing message states at the standby systems (S255, S355, T153). In the consistency recovery process described below in detail referring to FIG. 18 and after, through the series of processes, for messages to be recovered between the failover destination system and the non-failover destination system, a synchronization state of a message in each buffer is set in an already fixed state when messages are present in all the systems, and a synchronization message is reflected in the data store area in the failover destination system. Accordingly, the failover destination system can continue an operation as an active system 10.

Figure 18:
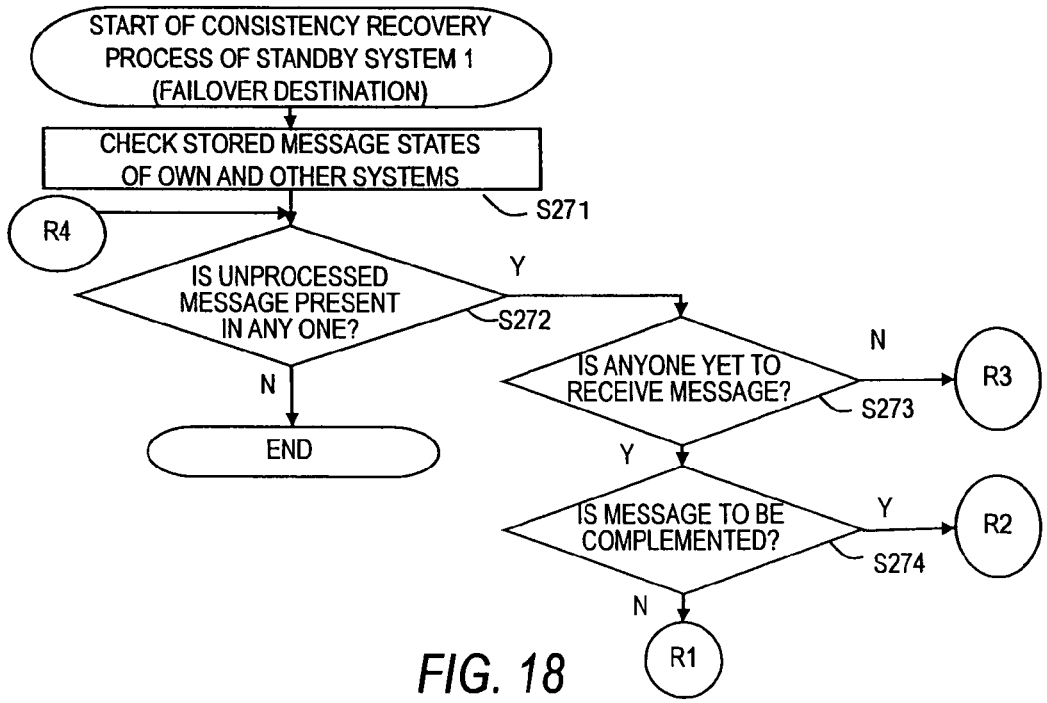
FIG. 18 is a flowchart illustrating an example of the consistency recovery process where a recovery method is selected to be implemented according to a message synchronization state according to a fourth embodiment of this invention.

FIG. 18 is a flowchart illustrating an example of the consistency recovery process where a recovery method is selected to be implemented according to a message synchronization state. FIG. 18 illustrates an example of execution carried out in the failover destination system.

The failover destination system refers to the synchronization state of the message of the other system (non-failover destination system) received in the step S254 of FIG. 17 and a synchronization system of a message of the own system to check a state of a certain message (S271), and judges whether the messages include an unprocessed message yet to be subjected to a consistency recovery process (S272). When a consistency recovery process has been completed for all the messages, or when a message to be recovered has not been stored in any system, the consistency recovery process is finished since consistency is guaranteed. On the other hand, when there is a stored message, the process of the step S273 and after is carried out.

Whether any one of the systems has not received a message is judged (S273). When none of the systems is in a message nonreceived state, a consistency process R3 of an already received message is loaded. The nonreceived state means a state where a message stored in a certain system has not been received by the other system. For example, as in the case of the message T101, a multicast-communicated message may not have reached a certain system due to a communication fault. In this case, when a message fixed only in a certain system is present, there is no system where the message is in a nonreceived state. It is because since at least a state after an already synchronized state is guaranteed for a fixed message in the other system according to the third embodiment, the message has been received by the other system, which is not a nonreceived state. This case can be realized by recording the message ID in the step S224 of FIG. 14 of setting the message fixed in each of the standby systems 20 and 30, or in the step S227 or S228 of deleting the fixed message.

When it is judged in the step S273 that a message nonreceived in a certain system is present, whether to complement the message so that the message can be set received in all the systems is judged (S274), and a consistency recovery process R2 for executing complementing or the consistency recovery process R1 for not executing complementing is loaded.

In the step S274, decision whether to execute complementing may be made based on message complement necessity setting made by a user shown in FIG. 22. FIG. 22 illustrates an example of message complement necessity setting which the user can designate. In the example of FIG. 22, complementing is judged by using information 315 setting a complement necessity by the user for each information 314 regarding a type of a stored message. For the information 314, an example designated as a message type by a message identifier is shown. However, information minutely designating processing contents of each message may be included. The message complement necessity includes information 316 indicating whether to complement for each client system 80 which has sent a message. By setting complement necessity for each message or each client system 80, for example, only important processing requests are recovered, and thus recovery time can be shortened more as compared with a case of recovering all messages. Additionally, in the example of the message complement necessity setting of FIG. 22, time range information 317 can be designated for setting an elapsed time range from reception at a certain system for each message type or each client system designated in the information 316, and judging complementing within the time range and not complementing over the time range. By using setting of such a time range, for example, inconsistency where since the client system 80 which has sent an input message has not received any response to the sent input message, when an error is recognized, the input message is mistakenly complemented, setting an error message received. As another example, for example, when the client system 80 resends the input message, the input message can be complemented before reception of the input message to be resent, and thus a reception response can be sent again quickly. In the example of the message complement necessity setting of FIG. 22, the upper limit number of messages to be complemented can be designated by information 318. In other words, judgment not to complement messages whose number exceeds the number designated by the information 318 can be set. Alternatively, judgment may be made by a method for defining the upper limit number of systems of nonreceived states to be complemented, and not complementing messages whose number exceeds the complement destination system upper limit number. Setting of such an upper limit number enables shortening of time necessary for the consistency recovery process.

Figure 19:
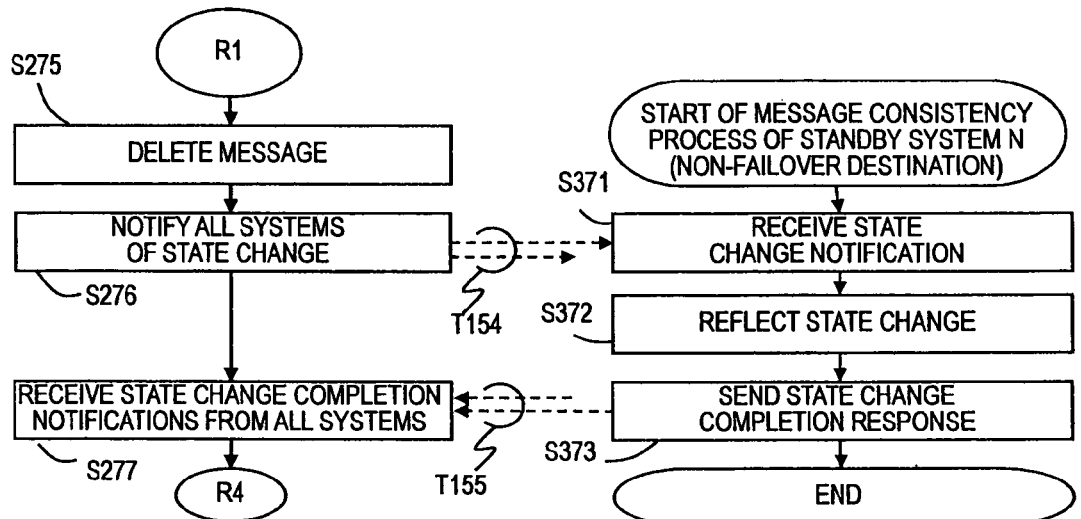
FIG. 19 is a flowchart illustrating an example of a consistency recovery process R1 when the nonreceived message is not complemented in the step S274 of FIG. 18.

FIG. 19 is a flowchart illustrating an example of a consistency recovery process R1 when the nonreceived message is not complemented in the step S274 of FIG. 18. In this process, consistency is set in a nonreceived state without complementing a target message.

The failover destination system deletes a relevant target message (S275). When there is no target message in the own system, the step S275 is skipped. Then, all the systems are notified of state changing through multicast communication to set the target message in a nonreceived state (delete the target message) (S276, T154). The message T154 contains, for example, a target message ID, and a state change. After reception of the message T155 (S371), the non-failover destination system changes a state of the target message (deletes the message) (S372) to return a state change completion response to the failover destination system (S373, T155). The failover destination system receives the message T155 from all the systems (S277). Thus, consistency recovery of the target message in the nonreceived state is completed, and the step S272 of FIG. 18 to process a next message is loaded (R4).

Figure 20:
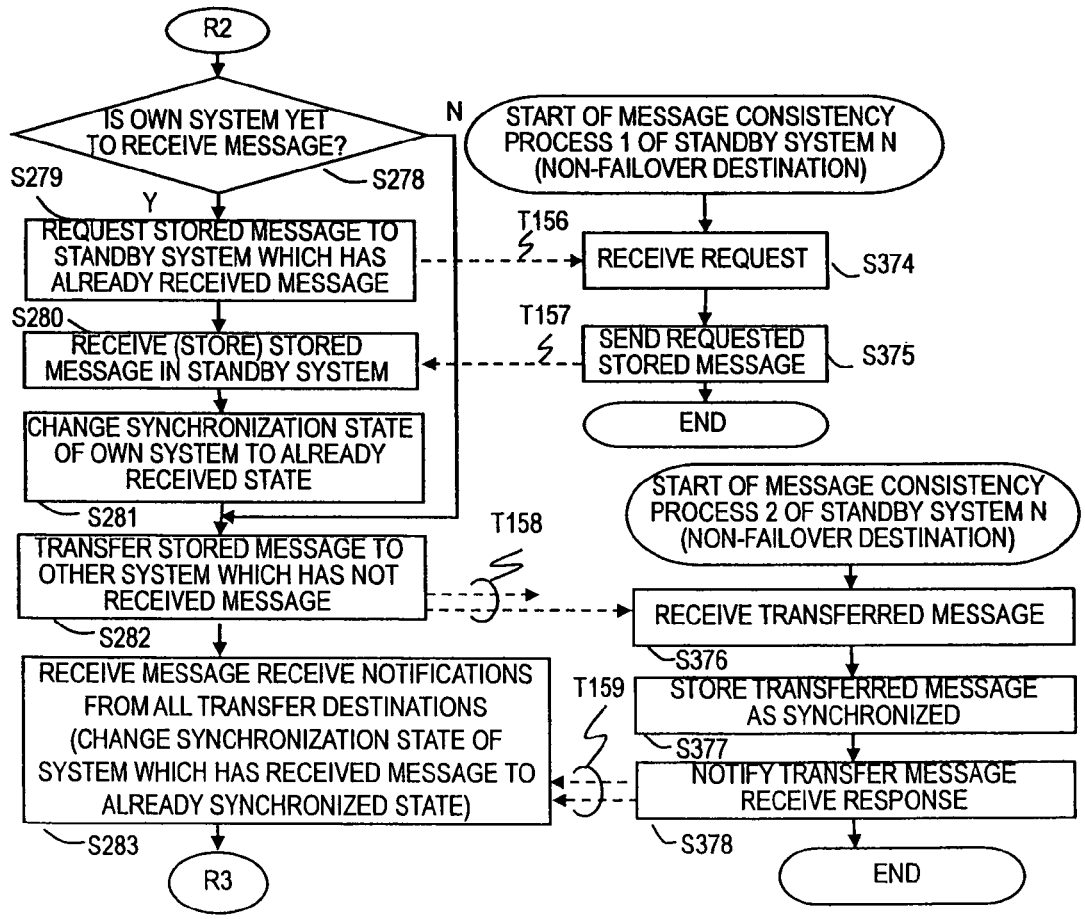
FIG. 20 is a flowchart illustrating an example of the consistency recovery process R2 when the nonreceived message is complemented in the step S274 of FIG. 18.

FIG. 20 is a flowchart illustrating an example of the consistency recovery process R2 when the nonreceived message is complemented in the step S274 of FIG. 18. In this process, a target message is complemented to set consistency in an already synchronized state.

The failover destination system first judges whether a relevant target message has been stored in the own system (S278). When the target message has not been held in the own system, the failover destination system requests the non-failover destination system holding the target message to send the target message (S279, T156). The non-failover destination system that has been requested to send the target message in a step S374 sends the stored target message to the failover destination system (S375, T157). After reception of the message 157 (S280), the failover destination system stores the target message in a corresponding message store buffer to change a state of the own system to an already received state (S281). Thus, since the target message has been stored in the own system, a message transfer process (step S282 and after) to the non-failover destination system not holding any message is carried out.

The failover destination system transfers the target stored message to the non-failover destination system not holding any message (S282, T158). The non-failover destination system that has received the message T158 in the step S376 stores the sent target message in a corresponding store buffer by setting a synchronization state of the own system to an already received state (S377) to return a message receive response of the transferred message (S378, T159).

After reception of the message T159, the failover destination system changes a synchronization state of a system which is a source to an already synchronized state to wait for responses from all the systems to which the message has been transferred in the step S282 (S283). The process has been described by way of case where the non-failover destination system not holding any message is present. However, when all the non-failover destination systems hold messages, the message transfer process of the step S292 and after is skipped. Thus, since the consistency recovery is completed in the already synchronized state where the target message is held in all the systems, the consistency process R3 of an already received message is carried out.

For a destination of the message T156, an optional system may be selected from the non-failover destination systems holding the target message, or a system expected to be fastest in communication may be selected. The latter case enables reduction of a transfer amount or recovery time. Alternatively, a method may be employed, which multicast-communicates a message to all the non-failover destination systems, but does not transfer a target message when the non-failover destination systems which have received the message store no message. In this case, since data is received from a non-failover destination system which has actually communicated first, a fluctuation occurs in a communication state. Even when a communication speed is difficult to be imagined, time necessary for the consistency recovery process can be shortened to shorten recovery time from failover. A destination of the message T158 may be realized by a method of executing multicast communication as all the non-failover destination systems, and not storing a target message in the non-failover destination system which has stored the target message. In this case, irrespective of presence of messages, the same mechanism as that of communication where a synchronization message is sent to the other standby system during a normal operation can be used. Accordingly, a communication function specialized for a consistency recovery process can be made unnecessary.

Figure 21:
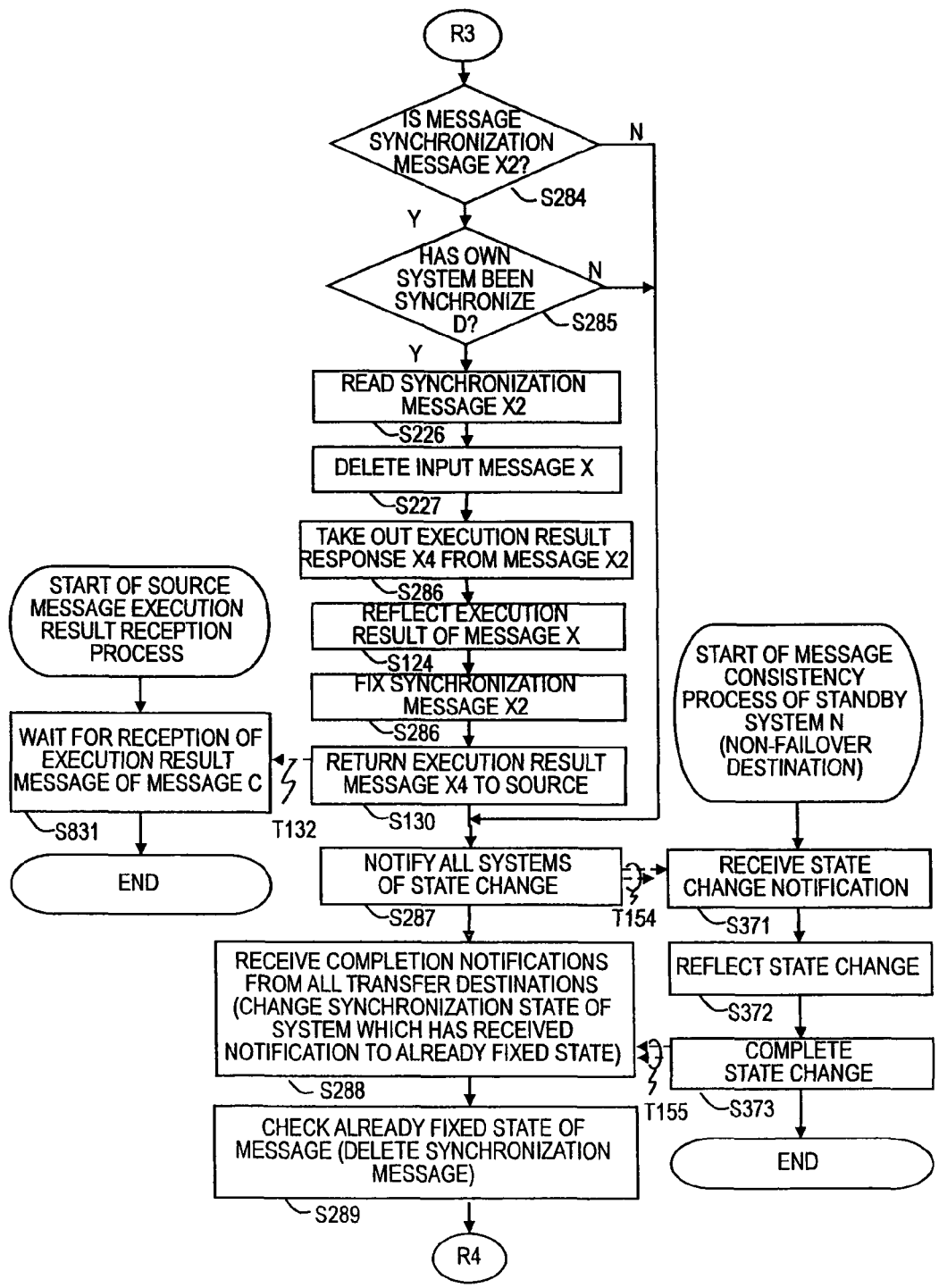
FIG. 21 is a flowchart illustrating an example of the consistency recovery process R3 of the already received message carried out when there is no nonreceived message in the step S273 of FIG. 18.

FIG. 21 is a flowchart illustrating an example of the consistency recovery process R3 of the already received message carried out when there is no nonreceived message in the step S273 of FIG. 18. A synchronization state of the message targeted in this process is one of synchronized and already fixed states in each system. In this process, consistency is set with a message of an already synchronized state set in an already fixed state.

First, the failover destination system judges whether a target message is a synchronization message (X2 by using the description method of the third embodiment) (S284).

When the target message is a synchronization message X2, the failover destination system judges whether the own system is in an already synchronized state (S285). When the own system is in an already synchronized state, in the failover destination system, a process below is carried out since the synchronization message has to be reflected before the failover destination system operates as (is taken over to) the active system 10. First, as in the case of the steps S226 and S227 of FIG. 14, the synchronization message X2 is read to delete a corresponding input message X. Then, an execution result response X4 is taken out of the synchronization message X2 to be stored in the sending message store buffer 212 (S286). As in the case of the steps S228 and S129, the execution result of the message X is reflected, and the synchronization message X2 is fixed. As in the case of the step S130, the execution result response X4 stored in the step S286 is sent.

Thus, in the failover destination system, when the process is taken over from the active system 10, when the synchronization state of the synchronization message is set to an already fixed state, the process equivalent to the process originally executed in the active system 10 is realized.

Then, the non-failover destination system is notified of the already fixed state, and a process of setting message consistency is carried out (step S287 and after).

The example of sending the execution result message X4 to the source (client system 80) has been described. However, for example, a method may be used, where the active system 10 checks with the client system 80 of the input message whether the message execution result has been sent in the step S130 of FIG. 14 before a fault occurrence, and the failover destination system skips the steps S286 and S130 regarding the execution result message X4 when sending is unnecessary. Thus, double sending of the received execution result by the client system 80 of the input message can be reduced to decrease a communication amount.

When the synchronization state of the own system is not an already synchronized state in the step S285, the state is an already fixed state, meaning completion of the series of synchronization message reflection processes, and the step S287 and after is similarly executed thereafter. When the target message is not a synchronization message in the step S284, the target message is an input message, meaning nonnecessity of the series of the reflection processes. The input message can be set in an already fixed state, and thus the step S287 and after is similarly executed thereafter.

First, in the step S287, as in the case of the step S276, the failover system sends a state change notification to all the systems (non-failover systems) through multicast communication to change the target message to an already fixed state. Then, as in the case of the steps S171 to S173, the non-failover destination system reflects the stage change to return a state change completion response T155 (steps S371 to S373). After reception of the state change completion response, the failover destination system changes the synchronization state of the system to an already fixed state to wait until the synchronization states of all the systems are set to already fixed states (S288). Accordingly, setting of an already fixed state of the target message in all the systems can be checked (S289). In the step S289, when the target message is a synchronization message, as in the case of the step S129, a step of deleting the synchronization message may be included.

Thus, the target already received message is set in a data updated state in the failover destination system, and in an already fixed state in the other non-failover destination system. This state is similar to the message synchronization state during the normal operation where the active system 10 executes the process up to the step S131 and the standby systems 20 and 30 execute the process up to the step S225, and consistency is guaranteed. Accordingly, upon completion of failover, the reflection step S228 of the execution result of the fixed synchronization message of the non-failover system is executed, realizing a consistency-recovered state. After completion of the step S289, the step S272 of FIG. 18 is loaded for a consistency recovery process of a next message (R4).

In the recovery process in the non-failover destination system, the process up to the process of fixing the synchronization message in the step S225 has been described above. However, a reflection process of the fixed synchronization message in the step S226 and after may be carried out. In this case, consistency can be guaranteed for contents of the data store area at the time of completion of the consistency recovery process.

The fourth embodiment has been described by way of case where the input message and the synchronization message are held as a modified example of the third embodiment. However, this embodiment may be applied when only an input message is present as in the case of the first embodiment, and the series of processes for the synchronization message may be skipped.

According to the fourth embodiment shown in FIGS. 17 to 21, in the in-memory application system, when a fault occurs during the period from the input message sending of the client system 80 to the transfer start of the active system 10, the input message is lost. However, because the input message is replicated in the standby systems 20 and 30, a highly reliable system capable of complementing the input message without losing it and continuing a process can be provided. Moreover, the synchronization message is similarly complemented. Thus, a highly reliable system capable of continuing, even when a fault occurs before completion of replication in the standby systems, when its processing result is present at least in one standby system, a process without re-executing a message process can be provided. In other words, even when the number of communication times is reduced by using the data replication method for reducing the number of communication times according to this invention, a highly reliable system can be provided.

Each of those embodiments of this invention has been described by way of case of using the multicast communication as the method for replicating data from the active system 10 to the standby systems 20 and 30. However, a different method may be used as long as it realizes replication of data in the destination system. For example, a method of replication which realizes DMA transfer or a shared memory through a hardware mechanism may be employed.

As described above, this invention can be applied to the in-memory application system which employs the cluster configuration. Especially, since the number of communication times can be reduced, this invention can be suitably applied to a system of a high communication frequency.

While the present invention has been described in detail and pictorially in the accompanying drawings, the present invention is not limited to such detail but covers various obvious modifications and equivalent arrangements, which fall within the purview of the appended claims.

What is claimed is:

1. A data replication method used in a data replication system comprising:
   a first computer equipped with a processor and a memory to execute an application; and
   a second computer equipped with a processor and a memory and capable of taking over from an active system,
      the first computer receiving a first message containing a first processing request,
      a plurality of the second computers replicating the first message,
   the method comprising the steps of:
   sending, by a third computer, the first message to the first computer and the plurality of the second computers;
   sending, by each of the second computers, a message receive notification of the first message to the first computer;
   waiting, by the first computer, for the message receive notifications from all the second computers; and
   receiving, by the first computer, the message receive notifications from the plurality of second computers, wherein
   the step of receiving the message receive notifications from the plurality of the second computers comprises the steps of:
      sending, by the first computer, after reception of the message receive notifications from the plurality of the second computers, the message receive notification of the first message to the third computer;
      validating, by the first computer, after the reception of the message receive notifications from the plurality of the second computers, the first processing request to be executable by the first computer; and
      notifying, by the first computer, after the reception of the message receive notifications from the plurality of the second computers, the second computers of validity of the first message.

2. The data replication method according to claim 1, further comprising the step of sending, by the third computer which has received the message receive notification of the first message, a second message containing a second processing request to the first computer and the plurality of the second computers, wherein
   the step of notifying, by the first computer, the plurality of the second computers of the validity of the first message sends together the second message containing the second processing request received from the third computer, and the notification indicating the validity of the first message.

3. The data replication method according to claim 1, further comprising the steps of:
   detecting, by the second computers, an occurrence of a fault in the first computer; and
   taking over, by the second computers, when the fault occurs in the first computer, from the first computer, wherein
   the step of taking over from the first computer when the fault occurs in the first computer includes the steps of:
      setting one of the plurality of the second computers as a failover destination computer which takes over from the first computer, and controlling the failover destination computer to make an inquiry about message reception states to the other second computers;
      collating, by the failover destination computer, the message reception states obtained as a result of making the inquiry with a message reception state held by the failover destination computer;
      setting, by the failover destination computer, when a result of the collation shows that an inconsistent state is present in the message reception states between the failover destination computer and the other second computers, reception states of all the second computers to the identical reception state; and taking over, by the failover destination computer, after setting of the reception states of all the second computers to the identical reception state, processing from the first computer where the fault has occurred.

4. The data replication method according to claim 3, wherein the step of setting, by the failover destination computer, the reception states of all the second computers to the identical reception state includes:

a first determination step of determining whether the message reception states of the inconsistent state are reception states before at least one of the second computers receives the message;

a first consistency guarantee step of instructing, by the failover destination computer, when a result of the determination shows the message reception states of the inconsistent state are the reception states before the at least one of the second computers receives the message, the second computers to delete the message;

a second determination step of determining whether the message reception states of the inconsistent state are reception states before at least one of the second computers receives the message, and whether at least one of the second computers has received the message;

a second consistency guarantee step of replicating, when a result of the determination shows that the message reception states of the inconsistent state are the reception states before the at least one of the second computers receives the message, and that the at least one of the second computers has received the message, the message from the second computer which has received the message to all the second computers; and a step of selecting at least one of the first consistency guarantee step and the second consistency guarantee step for each message.

5. The data replication method according to claim 4, wherein the step of selecting the at least one of the first consistency guarantee step and the second consistency guarantee step selects, by using at least one of processing contents of the message, an identifier of the third computer which has sent the message, time when the message is sent, and a resending timing of the message as a criterion, the first consistency guarantee step when the criterion is satisfied, and the second consistency guarantee step when the criterion is not satisfied.

6. The data replication method according to claim 5, wherein the criterion is set by a user of one of the first computer and the second computer.

7. The data replication method according to claim 1, wherein the step of notifying, by the first computer, the second computers of the validity of the first processing request controls the first computer to send together, when sending a third message to the second computers, the third message and the notification of the validity of the first processing request.

8. The data replication method according to claim 7, further comprising the step of updating, by the first computer, data in the memory by executing a message containing a third processing request, and notifying, by the first computer, the second computers of a result of the updating, wherein the third message is a notification of the result of the updating.

9. The data replication method according to claim 8, further comprising the steps of:

detecting, by the second computers, an occurrence of a fault in the first computer; and taking over, by the second computers, when the fault occurs in the first computer, from the first computer, wherein the step of taking over from the first computer when the fault occurs in the first computer includes the steps of:

setting one of the plurality of the second computers as a failover destination computer which takes over from the first computer, and controlling the failover destination computer to make an inquiry about message reception states to the other second computers;

collating, by the failover destination computer, the message reception states obtained as a result of making the inquiry with a message reception state held by the failover destination computer;

setting, by the failover destination computer, when a result of the collation shows that an inconsistent state is present in the message reception states between the failover destination computer and the other second computers, reception states of all the second computers to the identical reception state; and taking over, by the failover destination computer, after setting of the reception states of all the second computers to the identical reception state, processing from the first computer where the fault has occurred.

10. The data replication method according to claim 9, wherein the step of setting, by the failover destination computer, the reception states of all the second computers to the identical reception state includes:

a first determination step of determining whether the message reception states of the inconsistent state are reception states before at least one of the second computers receives the message;

a first consistency guarantee step of instructing, by the failover destination computer, when a result of the determination shows the message reception states of the inconsistent state are the reception states before the at least one of the second computers receives the message, the second computers to delete the message;

a second determination step of determining whether the message reception states of the inconsistent state are reception states before at least one of the second computers receives the message, and whether at least one of the second computers has received the message;

a second consistency guarantee step of replicating, when a result of the determination shows that the message reception states of the inconsistent state are the reception states before the at least one of the second computers receives the message, and that the at least one of the second computers has received the message, the message from the second computer which has received the message to all the second computers; and a step of selecting at least one of the first consistency guarantee step and the second consistency guarantee step for each message.

11. The data replication method according to claim 10, wherein the step of selecting the at least one of the first consistency guarantee step and the second consistency guarantee step selects, by using at least one of processing contents of the message, an identifier of the third computer which has sent the message, time when the message is sent, and a resending timing of the message as a criterion, the first consistency guarantee step when the criterion is satisfied, and the second consistency guarantee step when the criterion is not satisfied.

12. The data replication method according to claim 1, wherein one of the first computer and the second computer executes a process of the application only in the memory.

13. A data replication system, comprising:
a first computer equipped with a processor and a memory to execute an application; and
a second computer equipped with a processor and a memory and capable of taking over from an active system,
the first computer and a plurality of the second computers replicating a first message containing a first processing request sent from a third computer, wherein:
the third computer includes a third control unit for sending the first message to the first computer and the plurality of the second computers;
each of the second computers includes a second control unit for sending a message receive notification of the first message to the first computer; and
the first computer includes a first control unit for waiting for the message receive notifications from all the second computers, the first control unit including:
a first communication unit for sending, after reception of the message receive notifications from the plurality of the second computers, the message receive notification of the first message to the third computer;
a fix unit for validating, after the reception of the message receive notifications from the plurality of the second computers, the first processing request to be executable by the first computer; and
a second communication unit for notifying, after the reception of the message receive notifications from the plurality of the second computers, the second computers of validity of the first message.

14. The data replication system according to claim 13, wherein:
the third control unit of the third computer sends, after reception of the message receive notification of the first message, a second message containing a second processing request to the first computer and the second computer; and
the second communication unit sends together the second message containing the second processing request received from the third computer and the notification indicating the validity of the first message.

15. The data replication system according to claim 13, wherein the second communication unit sends together, when the first computer is controlled to send a third message to the second computers, the third message and the notification indicating the validity of the first message.

16. The data replication system according to claim 15, wherein:
the first computer includes a third communication unit for updating data in the memory by executing a message containing a third processing request, and for sending a result of the updating to the second computer; and
the third message is a notification of the result of the updating.

17. The data replication system according to claim 13, wherein
the second computer further includes:
a fault detection unit for detecting an occurrence of a fault in the first computer; and
a cluster control unit for taking over, when the fault detection unit detects the fault in the first computer, from the first computer, the cluster control unit being configured to:
set one of the plurality of the second computers as a failover destination computer which takes over from the first computer, and control the failover destination computer to make an inquiry about message reception states to the other second computers;
control the failover destination computer to collate the message reception states obtained as a result of making the inquiry with a message reception state held by the failover destination computer;
control the failover destination computer to set by a consistency guarantee unit of the cluster control unit, when a result of the collation shows that an inconsistent state is present in the message reception states between the failover destination computer and the other second computers, reception states of the second computers to the identical reception state; and
take over, after setting of the reception states of the second computer to the identical reception state, processing from the first computer where the fault has occurred.

18. The data replication system according to claim 17, wherein the consistency guarantee unit includes:
a first determination unit for determining whether the message reception states of the inconsistent state are reception states before at least one of the second computers receives the message;
a first consistency guarantee unit for controlling, when a result of the determination shows the message reception states of the inconsistent state are the reception states before the at least one of the second computers receives the message, the failover destination computer to instruct the second computers to delete the message;
a second determination unit for determining whether the message reception states of the inconsistent state are reception states before at least one of the second computers receives the message, and whether at least one of the second computers has received the message;
a second consistency guarantee unit for replicating, when a result of the determination shows that the message reception states of the inconsistent state are the reception states before the at least one of the second computers receives the message, and that the at least one of the second computers has received the message, the message from the second computer which has received the message to all the second computers; and
a selection unit for selecting at least one of the first consistency guarantee unit and the second consistency guarantee unit for each message.

19. The data replication system according to claim 18, wherein the selection unit selects, by using at least one of processing contents of the message, an identifier of the third computer which has sent the message, time when the message is sent, and a resending timing of the message as a criterion, the first consistency guarantee unit when the criterion is satisfied, and the second consistency guarantee unit when the criterion is not satisfied.

20. The data replication system according to claim 13, wherein one of the first computer and the second computer executes a process of the application only in the memory.

* * * * *